United States Patent [19]
Feeney et al.

[11] Patent Number: 6,087,016
[45] Date of Patent: Jul. 11, 2000

[54] BARRIER COATING OF AN ELASTOMER AND A DISPERSED LAYERED FILLER IN A LIQUID CARRIER

[75] Inventors: Carrie A. Feeney, Bridgewater, N.J.; Michele Farrell, Bethlehem, Pa.; Klaus Tannert, Nordrhein-Westfalen, Germany; Harris A. Goldberg, Edison; Mengshi Lu, North Plainfield, both of N.J.; Michael D. Grah; William G. Steiner, both of Simpsonville, S.C.; Paul B. Winston, Greer, S.C.

[73] Assignees: InMat, LLC, N.J.; Michelin Recherche et Technique S.A., Switzerland

[21] Appl. No.: 09/093,332

[22] Filed: Jun. 8, 1998

Related U.S. Application Data

[63] Continuation-in-part of application No. 08/871,574, Jun. 9, 1997, abandoned.

[51] Int. Cl.[7] .................................. C09D 1/02; C09D 5/02
[52] U.S. Cl. ...................... 428/454; 427/245; 427/412.3; 524/441; 524/446; 524/447; 524/448; 524/449; 524/450; 524/791; 524/836; 524/856; 523/166
[58] Field of Search ..................................... 428/402, 454; 524/447, 449, 791, 836, 856, 446, 448, 450, 441; 523/166; 427/245, 412.3

[56] References Cited

U.S. PATENT DOCUMENTS

| | | |
|---|---|---|
| 2,795,545 | 6/1957 | Gluesenkamp . |
| 3,038,515 | 6/1962 | Koch et al. . |
| 3,250,735 | 5/1966 | Higgins . |
| 3,764,456 | 10/1973 | Woodhams . |
| 3,769,122 | 10/1973 | Coddington et al. . |
| 3,799,799 | 3/1974 | Woodhams et al. . |
| 4,247,576 | 1/1981 | Kutner . |
| 4,269,628 | 5/1981 | Ballard et al. . |
| 4,282,131 | 8/1981 | Trousil . |
| 4,289,805 | 9/1981 | Dubow . |
| 4,344,859 | 8/1982 | Burke, Jr. . |
| 4,360,611 | 11/1982 | Wakimoto et al. . |
| 4,400,485 | 8/1983 | Mukamal et al. . |
| 4,418,093 | 11/1983 | Gomberg et al. . |
| 4,425,465 | 1/1984 | Padget et al . |
| 4,427,452 | 1/1984 | Jeffs . |
| 4,431,755 | 2/1984 | Weber et al. . |
| 4,466,831 | 8/1984 | Murphey . |
| 4,466,832 | 8/1984 | Yoshimura et al. . |
| 4,472,538 | 9/1984 | Kamigaito et al. . |
| 4,480,005 | 10/1984 | Brownscombe . |
| 4,501,843 | 2/1985 | Needham . |
| 4,503,158 | 3/1985 | Richard . |
| 4,528,235 | 7/1985 | Sacks et al. . |
| 4,536,425 | 8/1985 | Hekal . |
| 4,537,866 | 8/1985 | Gilson . |
| 4,560,715 | 12/1985 | Ueeda et al. . |
| 4,613,542 | 9/1986 | Alexander . |
| 4,668,724 | 5/1987 | Harriett . |
| 4,681,818 | 7/1987 | Unnam et al. . |
| 4,713,114 | 12/1987 | Smith . |
| 4,775,586 | 10/1988 | Bohrn et al. . |
| 4,800,103 | 1/1989 | Jeffs . |
| 4,803,231 | 2/1989 | Seinera et al. . |
| 4,810,734 | 3/1989 | Kawasumi et al. . |
| 4,818,782 | 4/1989 | Bissot . |
| 4,857,397 | 8/1989 | Mowdood et al. . |
| 4,883,829 | 11/1989 | Smigerski et al. . |

(List continued on next page.)

FOREIGN PATENT DOCUMENTS

| | | |
|---|---|---|
| 459472 | 12/1991 | European Pat. Off. . |
| 463740 | 1/1992 | European Pat. Off. . |
| 518647 | 12/1992 | European Pat. Off. . |
| 761739 | 3/1997 | European Pat. Off. . |
| 2123034 | 1/1984 | United Kingdom . |
| WO 92/01575 | 2/1992 | WIPO . |
| WO 92/20538 | 11/1992 | WIPO . |
| WO 92/04177 | 3/1993 | WIPO . |
| WO 93/04118 | 3/1993 | WIPO . |
| WO 93/11190 | 6/1993 | WIPO . |
| WO94/22680 | 10/1994 | WIPO . |
| WO 97/00910 | 1/1997 | WIPO . |
| WO97/47678 | 12/1997 | WIPO . |

OTHER PUBLICATIONS

G. van Amerongen, "Diffusion in Elastomers", *Rubber Chem. Tech.*, 37:1065–1152 (1964).

E.L. Cussler et al, "Barrier Membranes", *Journal of Membrane Science*, 38:161–174 (1988).

D. Eitzman et al, "Barrier Membranes with Tipped Impermeable FLakes", *AICHE. Journal,* 42(1):2–9 (Jan. 1996).

P. Messersmith et al, "Synthesis and Barrier Properties of Poly (ε–Caprolactone)–Layered Silicate Nanocomposites", *J. of Polymer Science,* 33:1047–1057 (1995).

B. Pant et al, "Modification of Polystyrene Barrier Properties", *Polymer,* 35(12):2549–2553 (1994).

W.J. Ward et al, "Gas Barrier Improvement Using Vermiculite and Mica in Polymer Films", *Journal of Membrane Science,* 55:173–180 (1991).

Japanese Patent Application No. JP5017641, published Jan. 26, 1993 (Abstract).

Japanese Patent Application No. JP7081306, published Mar. 28, 1995 (Abstract).

Japanese Publication No. 63189446, published Aug. 5, 1988 (Abstract only).

International Standard, ISO 2556–1974(E), "Plastics–Determination of the Gas Transmission Rate of Films and Thin Sheets under Atmospheric Pressure—Manometric Method", European Committee for Standardization, pp. 36–39 (1974).

*Primary Examiner*—Veronica P. Hoke
*Attorney, Agent, or Firm*—Howson and Howson

[57] ABSTRACT

Barrier coating mixtures contain in a carrier liquid, (a) an elastomeric (preferably butyl-containing) polymer; (b) a dispersed exfoliated layered filler having an aspect ratio greater than 25; and (c) at least one surfactant, wherein the solids content of the mixture is less than 30% and the ratio of polymer (a) to filler (b) is between 20:1 and 1:1. Coated articles, which are rigid or flexible and elastomeric, and free-standing films and membranes, which are flexible and elastomeric, are produced using the barrier coating mixtures.

56 Claims, 9 Drawing Sheets

U.S. PATENT DOCUMENTS

| | | |
|---|---|---|
| 4,885,330 | 12/1989 | Brungardt et al. . |
| 4,889,885 | 12/1989 | Usuki et al. . |
| 4,911,218 | 3/1990 | Patitsas . |
| 4,928,741 | 5/1990 | Rye et al. . |
| 4,960,639 | 10/1990 | Oda et al. . |
| 4,983,432 | 1/1991 | Bissot . |
| 5,036,113 | 7/1991 | Boon et al. . |
| 5,040,583 | 8/1991 | Lin et al. . |
| 5,049,609 | 9/1991 | Patitsas . |
| 5,055,137 | 10/1991 | Holcombe, Jr. et al. . |
| 5,091,467 | 2/1992 | Beers . |
| 5,130,110 | 7/1992 | Rouet et al. . |
| 5,156,921 | 10/1992 | Lin et al. . |
| 5,178,702 | 1/1993 | Frerking, Jr. et al. . |
| 5,238,668 | 8/1993 | Novotny et al. . |
| 5,244,429 | 9/1993 | Sinclair . |
| 5,244,729 | 9/1993 | Harrison et al. . |
| 5,248,720 | 9/1993 | Deguchi et al. . |
| 5,292,590 | 3/1994 | Lin et al. . |
| 5,300,555 | 4/1994 | Weih et al. . |
| 5,344,633 | 9/1994 | Sorensson et al. . |
| 5,354,548 | 10/1994 | Araya et al. . |
| 5,364,463 | 11/1994 | Hull . |
| 5,368,930 | 11/1994 | Samples . |
| 5,443,104 | 8/1995 | Dollinger et al. . |
| 5,462,779 | 10/1995 | Misiano et al. . |
| 5,503,820 | 4/1996 | Moffett et al. . |
| 5,532,307 | 7/1996 | Bogan, Jr. . |
| 5,552,469 | 9/1996 | Beall et al. . |
| 5,560,773 | 10/1996 | Gimvang . |
| 5,565,273 | 10/1996 | Egli et al. . |
| 5,575,953 | 11/1996 | Tachiaono et al. . |
| 5,576,372 | 11/1996 | Kresge et al. . |
| 5,576,373 | 11/1996 | Kresge et al. . |
| 5,578,672 | 11/1996 | Beall et al. . |
| 5,631,080 | 5/1997 | Fugitt . |
| 5,635,548 | 6/1997 | Kittle et al. . |
| 5,665,183 | 9/1997 | Kresge et al. . |
| 5,665,810 | 9/1997 | Patchett et al. . |
| 5,705,444 | 1/1998 | Tompkins et al. . |
| 5,807,629 | 9/1998 | Elspass et al. . |
| 5,883,173 | 3/1999 | Elspass . |

BARRIER COATING OF AN ELASTOMER AND A DISPERSED LAYERED FILLER IN A LIQUID CARRIER

CROSS-REFERENCE TO OTHER APPLICATIONS

This is a continuation-in-part of U.S. patent application Ser. No. 08/871,574, filed Jun. 9, 1997 now abandoned.

FIELD OF THE INVENTION

The present invention relates to novel barrier coating compositions, and particularly to coatings which have an enhanced reduction in gas, chemical and vapor permeability.

BACKGROUND OF THE INVENTION

Barrier coatings which prevent, or reduce, contact of a selected substrate with a gas, vapor, chemical and/or aroma have been widely described, and such coatings are used in a variety of industries, e.g., the packaging industries, automobile industries, paint industries, tire industries etc. Some of these barrier mixtures or coatings have been proposed to contain plate-like structures to reduce permeability. See, for example, E. L. Cussler et al, *J. Membrane Sci* 38:161–174 (1988); W. J. Ward et al, *J. Membrane Sci.,* 55:173–180 (1991); U.S. Pat. Nos. 4,528,235; 4,536,425; 4,911,218; 4,960,639; 4,983,432; 5,091,467; and 5,049,609; and International Patent Application No. WO93/04118, published Mar. 4, 1993, among others.

Despite the numerous disclosures of barrier coatings mixtures, most of the coatings useful in the industry either do not optimally reduce permeability or tend to be brittle and non-flexible. For example, attempts to improve the gas permeability of butyl rubber as well as retain its elasticity and fatigue resistance, have involved coating butyl rubber in tires with a polymer containing a platelet filler. See, e.g., U.S. Pat. Nos. 4,911,218 and 5,049,609. Only minimal decreases in permeability were achieved by this process.

Other attempts to increase the gas barrier properties of rubber used in tires have included compositions of rubber having layered silicate platelets dispersed within the rubber composition. See e.g. U.S. Pat. No. 4,857,397; WO97/00910 and G. J. van Amerogen, "Diffusion in Elastomers", *Rubber Chem Tech,* 37, pp 1065–1152 (1964). Exfoliated layered silicate material has been used to improve the gas barrier properties of rubber. See, e.g. U.S. Pat. No. 5,552,469.

Several references have been made to the orientation of platelet materials in rubber and polymeric compositions. Specific perpendicular orientation of the platelets to the direction of gas diffusion has been found to decrease gas permeability of rubber compositions containing layered silicate platelets, while not adversely affecting the flexibility of the rubber. See e.g. U.S. Pat. Nos. 5,576,372; 5,576,373; and 5,665,183. Puncture resistance is increased in polymeric sheet material comprising discrete platelets which are oriented substantially parallel to the plane of the sheet material in an overlapping interrelation. See, e.g., U.S. Pat. No. 5,665,810.

Most of the coatings useful in the industry which contain platelet type fillers are prepared by melt processing, in which solid polymer and solid filler are melted together and mixed at high shear rates. Such melt-processed coatings have 100% solids, and usually use less than about 3% by weight of the platelet fillers. Such coatings do not optimally reduce permeability.

Tires with integral innerliners are disclosed in U.S. Pat. No. 5,178,702, wherein the tire has a top layer and multiple layers of rubber laminate in which at least two layers are barrier layers comprising a sulfur cured rubber composition having 100 parts by weight rubber, 100 parts by weight acrylonitrile/diene polymer and about 25–150 parts by weight of platy filler of unspecified width and thickness. These compositions are stated to reduce the costs of the innerliners while maintaining flexibility and barrier performance.

There remains a need in the art for additional barrier coating mixtures and coated flexible and elastomeric articles with improved permeability characteristics useful in a variety of industries, particularly the tire industry.

SUMMARY OF THE INVENTION

The present invention solves the problems of the prior art by providing a coating composition which contains substantially dispersed exfoliated layered silicates in an elastomeric polymer. This coating, when dried, results in an elastomeric barrier with a high effective aspect ratio and improved permeability characteristics, i.e., a greater increase in the reduction of permeability of the coating.

In one aspect, the present invention provides a barrier coating mixture which contains in a carrier liquid, (a) an elastomeric polymer; (b) a dispersed exfoliated layered platelet-like filler having an aspect ratio greater than 25; and (c) at least one surfactant. The solids content of the mixture is less than 30% and the ratio of polymer (a) to filler (b) is between about 20:1 and 1:1. Preferably, in the barrier coating mixture, the polymer is present at between about 1 to 30% in liquid form and between about 45% to about 95% by weight in the dried coating. The dispersed layered filler is present in the liquid coating mixture at between about 1 to about 10% by weight, and in the dried coating formed thereby, at between about 5% to about 55% by weight. The dried coating, in which the filler exhibits an effective aspect ratio of greater than about 25, and preferably greater than about 100, reduces the gas, vapor or chemical permeability greater than 5-fold that of the dried, unfilled polymer alone.

In one embodiment, the invention provides a preferred barrier coating mixture which has a solids contents of between about 5 to about 15% by weight, and comprises in its dried state between about 65% to about 90% by weight of a butyl rubber latex, between about 10% to about 35% by weight of a layered filler, desirably vermiculite, and between about 0.1% to about 15% by weight of a surfactant.

In a further aspect, the present invention provides a coated article, which has on at least one surface or interface thereof, a dried barrier coating produced from application of the barrier coating mixture as described above. The coating on the article, in which the filler preferably exhibits an effective aspect ratio of greater than about 25, preferably greater than about 100, reduces the gas, vapor or chemical permeability of said article greater than 5-fold the permeability of said article coated with the polymer alone.

In yet a further aspect, the invention provides a film comprising an elastomeric polymer, a layered filler having an effective aspect ratio greater than 25, and at least one surfactant. Preferably the polymer is present in said mixture when dried at a weight percent of at least about 45%. The filler is preferably present in said mixture when dried at greater than about 5% by weight (or greater than 2% by volume). The film, in which the filler exhibits an effective aspect ratio of greater than about 25, and preferably greater than about 100, has a reduced gas, vapor or chemical permeability greater than 5-fold when compared to a film formed of the dried, unfilled polymer alone.

Other aspects and advantages of the present invention are described in the detailed description below and in the claims.

DETAILED DESCRIPTION OF THE INVENTION

Figure 1:
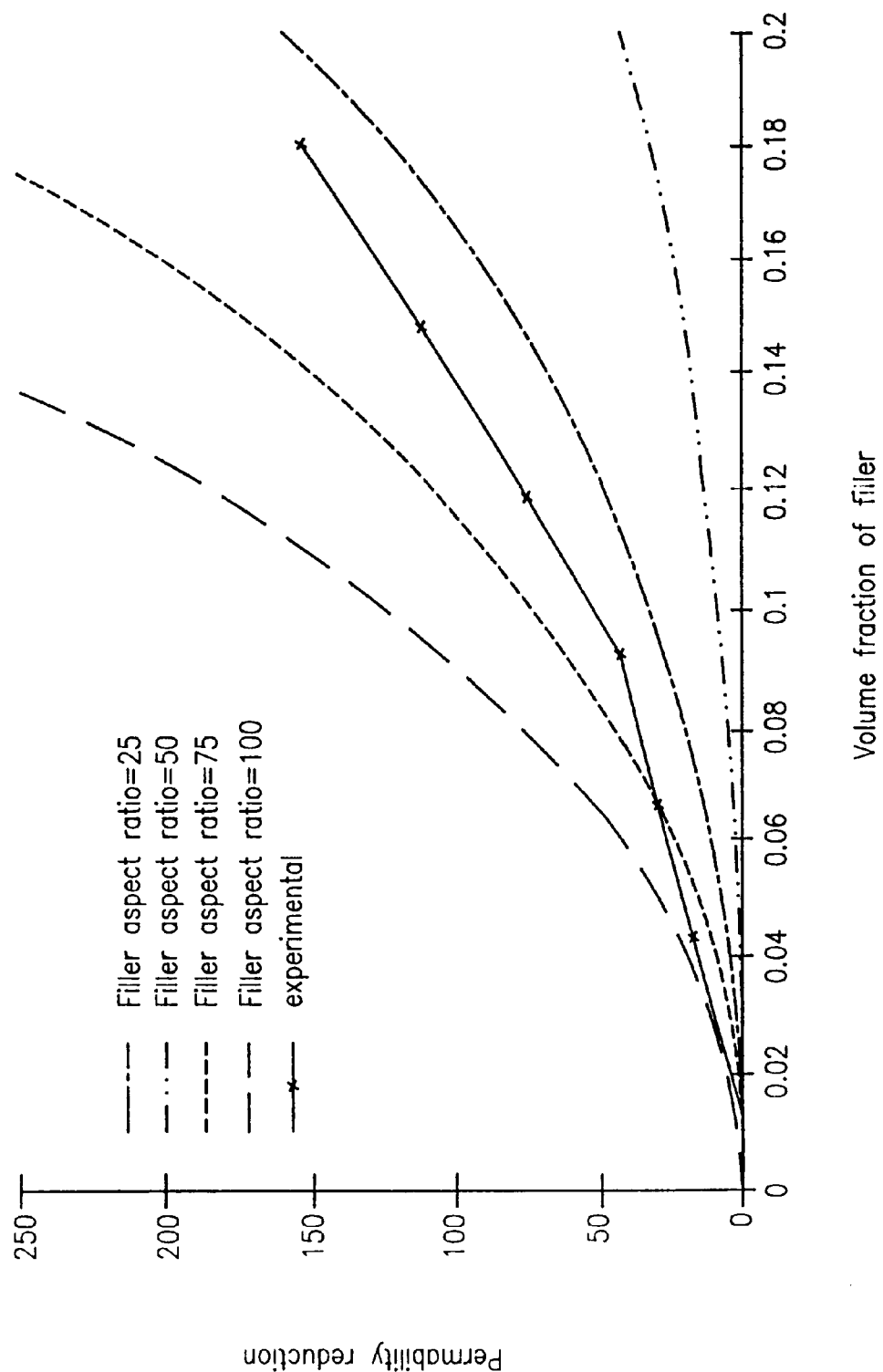
FIG. 1 is a "Cussler" model graph indicating the effective aspect ratios achieved by compositions of this invention. The graph plots reduction of permeability vs. volume percentages of filler in barrier coating mixtures of the present invention. Cussler describes several models for the permeability reduction due to oriented layered fillers, which depend on the microstructure expected. For simplicity, this invention employs the equation: $P_u/P=[1+(a^2X^2)/(1-X)]/(1-X)$, where P is the permeability of the filled material, $P_u$ is the permeability of the unfilled material; a is the aspect ratio of the filler particles; X is the volume fraction of the filler particles in the coating. Cussler's theoretical curves for fillers with aspect ratios of 25, 50, 75, and 100 are present on the graph. The thick "experimental" data line records the experimental data points for the barrier coating mixtures of Examples 1–8 below. Effective aspect ratios can be estimated from the position of the data relative to the theoretical curves.
Figure 2:
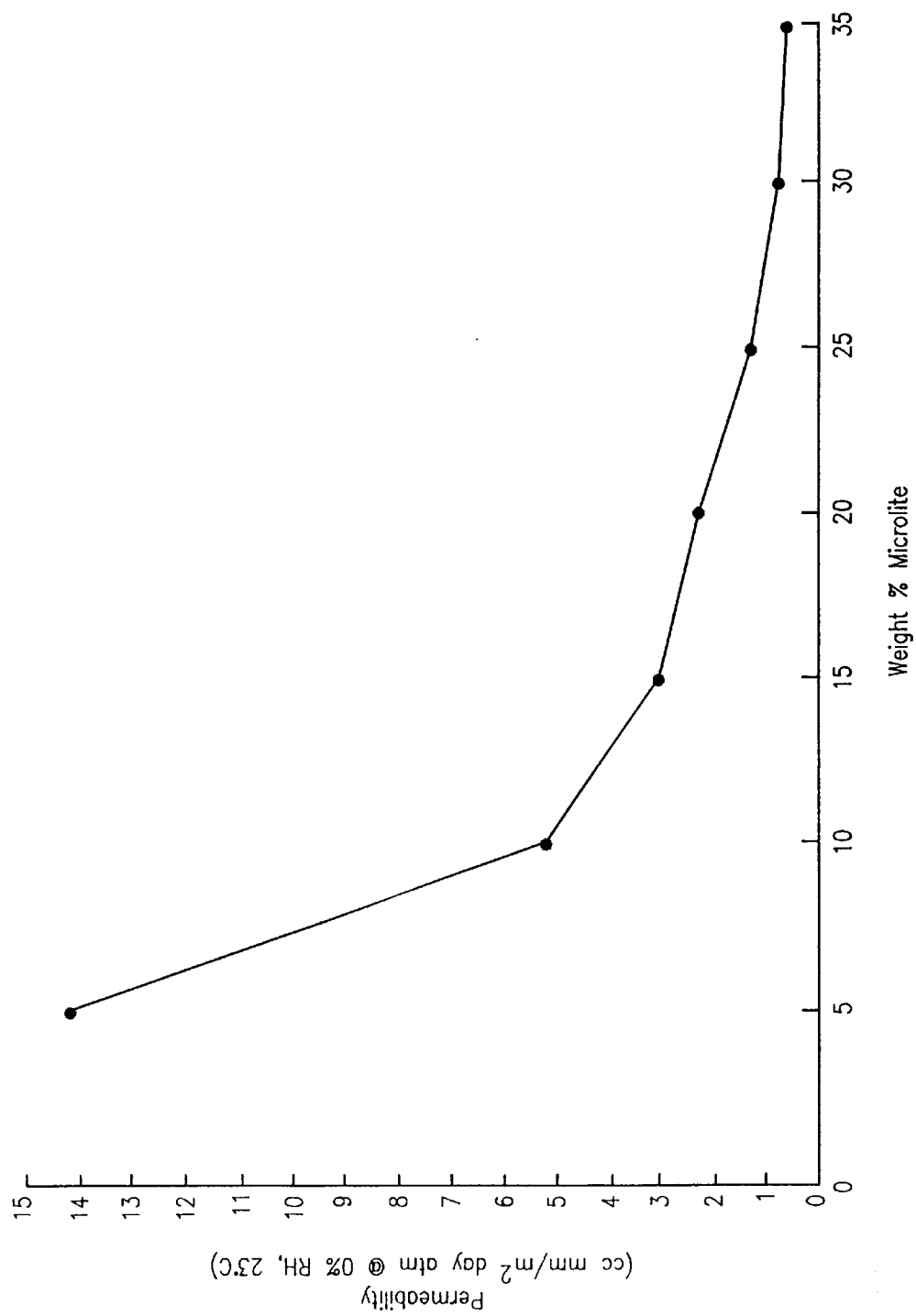
FIG. 2 is a graph plotting permeability results based on the weight percentage of a filler, vermiculite. Permeability is plotted vs. weight % of filler. Increase in weight % of filler decreases the permeability of the coating.
Figure 3:
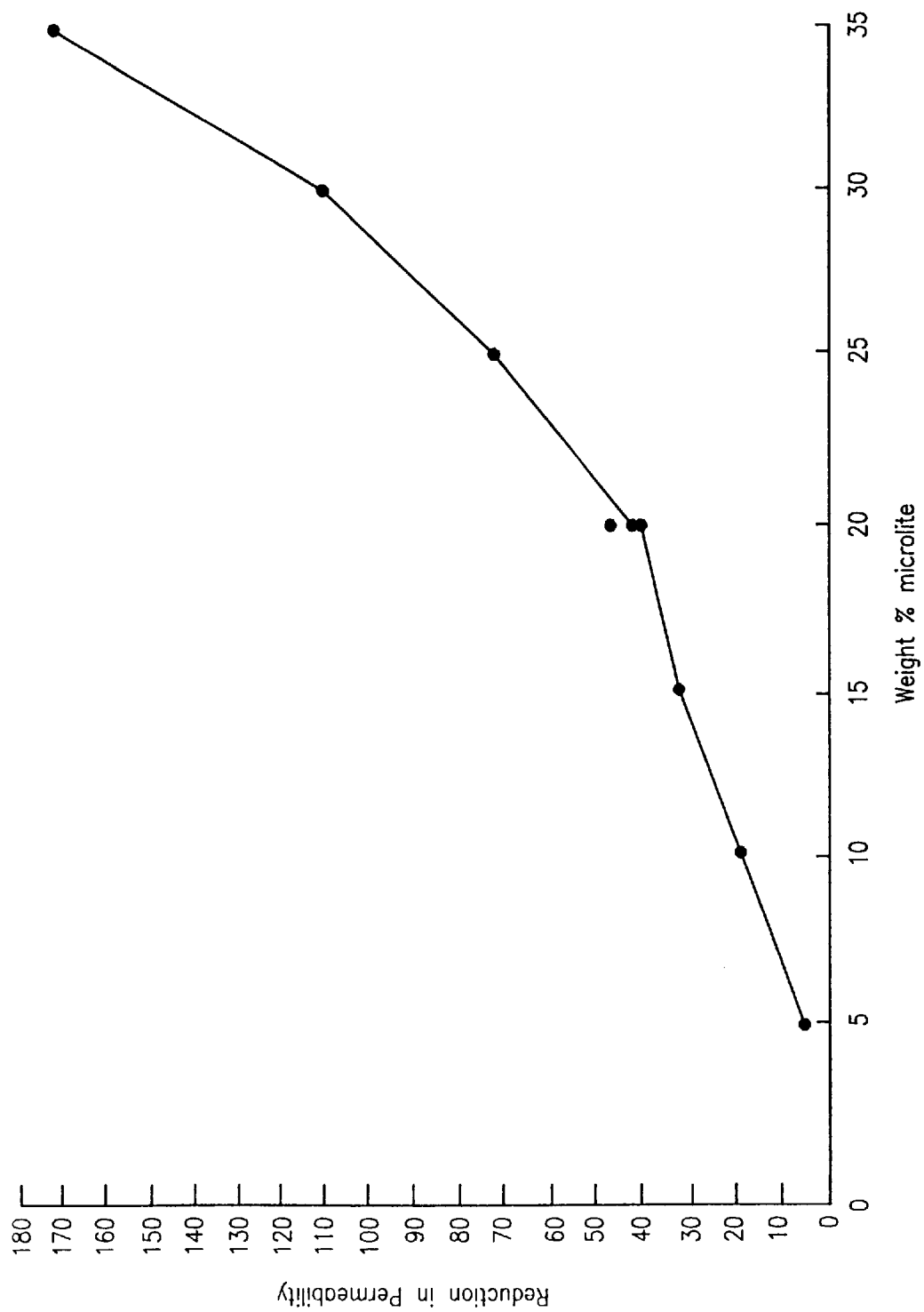
FIG. 3 is a graph plotting reduction in permeability vs. weight % of filler in coating. Increase in weight % of filler increases the reduction of permeability.

The present invention fills the unmet need in the art of barrier coatings by providing barrier coating mixtures suitable for application to flexible or elastomeric substrates, including flexible or elastomeric substrates under pressure. These coatings of the invention reduce the gas, vapor or chemical permeability of these substrates. The coated articles, as well as free-standing films and membranes produced by these barrier coating mixtures are also provided by the invention.

I. Definitions

As used herein, the term "mixture" or "coating mixture" is interpreted to include true liquid solutions, as well as colloidal dispersions, suspensions, emulsions and latexes as they are conventionally defined. For example, by "colloidal dispersion or latex" is meant any dispersion or suspension of particles in liquid, the particles being of a size greater than molecular scale, e.g., about 0.001 to about 0.1 micron. An emulsion generally contains particles of about 0.05 to 1.0 microns, in liquid. A "suspension" generally contains particles of greater than 1.0 micron in liquid.

A "barrier coating mixture" as used herein is meant a liquid containing dissolved or suspended solids, which is used to apply said solids to a substrate. A novel aspect of the present invention is that the barrier coating mixtures provide a better dispersion of platelet fillers in liquid at an unusually low solids content, e.g., between about 1 to about 30% solids as described in more detail below. According to this invention, once the "coating mixture" is dried, it is referred to as a "dried coating" or a "film".

The term "vapor barrier" implies a barrier to a liquid and its vapor. Conventionally, a vapor is the gas in equilibrium with a liquid at atmospheric pressure. For simplicity, as used herein, the term "vapor barrier" can be interpreted to mean a barrier to gases and chemicals as well as traditionally defined vapors.

The term "gas barrier" includes a barrier to oxygen, nitrogen, carbon dioxide and other gases.

"Chemical barrier" includes a barrier to the migration or blooming of a molecule from one substrate to another or out of one substrate to that substrate's surface.

The term "substrate" or "article" coated by these coatings include, without limitation, flexible and elastomeric (or highly elastic) materials, such as rubber, and other surfaces, such as tires, balloons, gloves, prophylactics, diaphragms and membranes for accumulation, actuators and regulators, and the like.

The term "aspect ratio" is a characteristic of every platelet material in solid form. Aspect ratio is the product of the lateral dimension of a platelet filler particle, e.g., mica flake, divided by the thickness of the platelet. "High aspect ratio" refers to a platelet filler whose lateral dimension divided by thickness is greater than 25. The aspect ratio of any filler is an inherent property of the selected filler. For example, MICROLITE® 963++ aqueous vermiculite solution [W. R. Grace] has a characteristic aspect ratio of about 10,000 or dimensions of 10–30 μm×10 Å.

Intercalation is defined as the state of a coating composition in which polymer is present between each layer of a platelet filler. Intercalation can be defined by the detection of an X-ray line, indicating a larger spacing between vermiculite layers than in the original mineral. "Exfoliation" is defined for layered fillers as the complete separation of individual layers of the original particle, so that polymer completely surrounds each particle. Desirably so much polymer is present between each platelet, that the platelets are randomly spaced. No X-ray line appears because of the random spacing of exfoliated platelets. In some circumstances, the filler can exfoliate when dispersed in an aqueous or non-aqueous medium. This would result in a higher aspect ratio than that of a solid particle before dispersion.

The term "effective aspect ratio" relates to the behavior of the platelet filler when incorporated into a binder. The platelet may not exist in a single platelet formation, but in many forms, such as a bundle of 10–50 platelets or hundreds of platelets, referred to as agglomerates. If the platelets are not in the single layer form, the aspect ratio of the entire bundle or agglomerate is much lower than that of the single layer particle. Therefore, the aspect ratio of the particles in a binder is referred to as an effective aspect ratio. The effective aspect ratio is determined by plotting the experimental data versus theoretical model, such as described by E. L. Cussler et al, *J. Membrane Sci.*, 38:161–174 (1988). A graph of reduction in permeability versus the volume % of filler in the binder generates theoretical curves for each effective aspect ratio. The graph predicts an effective aspect ratio for the experimental data. See FIG. 1.

II. The Barrier Coating Mixture

A barrier coating mixture according to this invention includes the following components in a carrier liquid (i.e., aqueous or solvent):

(a) an elastomeric polymer;

(b) a dispersed, exfoliated layered platelet filler having an aspect ratio greater than 25; and (c) at least one surfactant, wherein the solids content is desirably below 30% solids and the ratio of polymer (a) to filler (b) is between about 20:1 and 1:1. These barrier coating mixtures result in films with reductions in permeability of 5× to 2300× relative to the unfilled polymer. These results are substantially higher than the prior art on other platelet filled barrier coatings.

The barrier coating mixtures of this invention are characterized by a balancing of several critical features, i.e., appropriate dispersion of the filler in the elastomeric polymer, orientation of the filler platelets in the elastomeric polymer, as well as high aspect ratio of the filler, in order to achieve the desired permeability reductions and flexibility in the dried barrier coating. These characteristics are demonstrated by the data shown in FIG. 1. The barrier coating mixture of this invention desirably contains an unusually low solids content, i.e., between about 1% and about 30% solids. A more desirable range of solids content is between about 5% to about 17% solids. The solids content is an important consideration in the barrier coatings compositions and performance of the dried coatings because the solids content effects the dispersion of the high aspect ratio filler. If high total solids content is used in the barrier coating composition, one would not achieve well dispersed filler, e.g., vermiculite, and the permeability reductions characteristic of the coatings of this invention, and reported in the examples and figures herein, are not achieved. The preferred range of solid content (5–17%) is unexpectedly well below that typically used in the coating industry and therefore not predicted by the prior art teachings concerning barrier coatings formulations.

Figure 4:
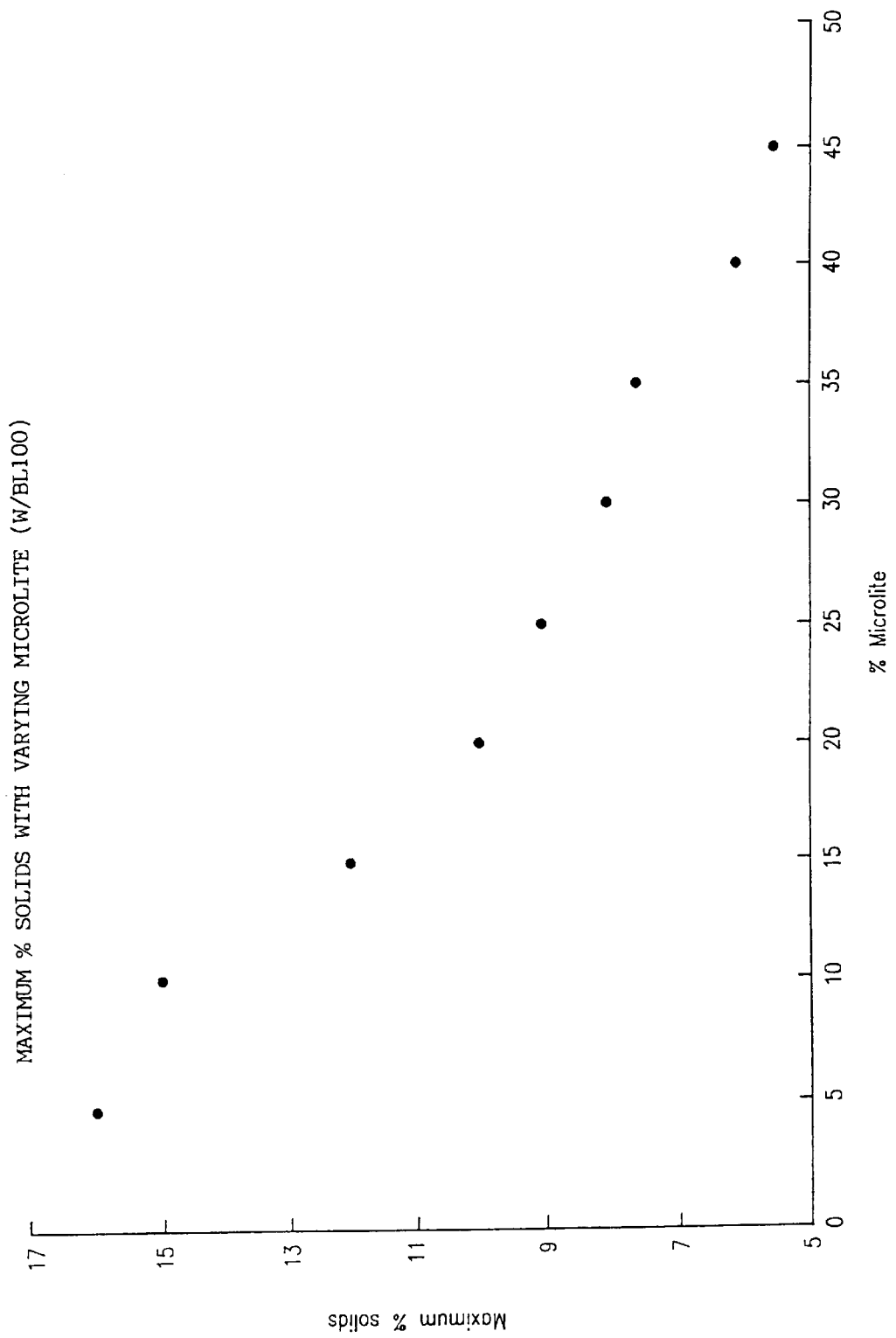
FIG. 4 is a graph illustrating the maximum percentage solids useful in coating compositions of the invention using butyl latex (BL100™), vs. percentage by weight of MICROLITE® vermiculite in the compositions.
Figure 5:
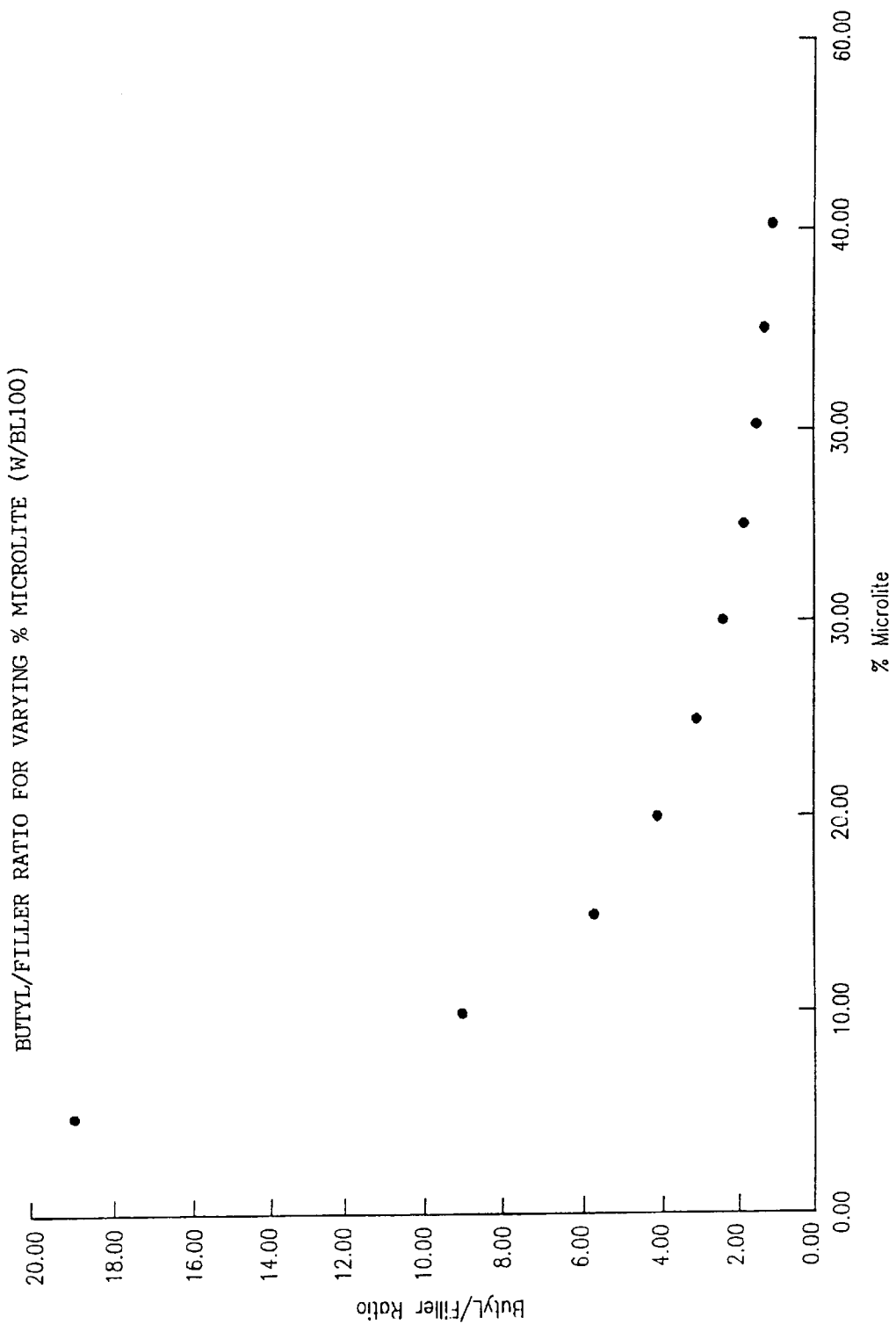
FIG. 5 is a graph illustrating the butyl latex (BL100™) to filler ratio useful in coating compositions of the invention vs. percentage by weight of MICROLITE® vermiculite in the compositions.
Figure 6:
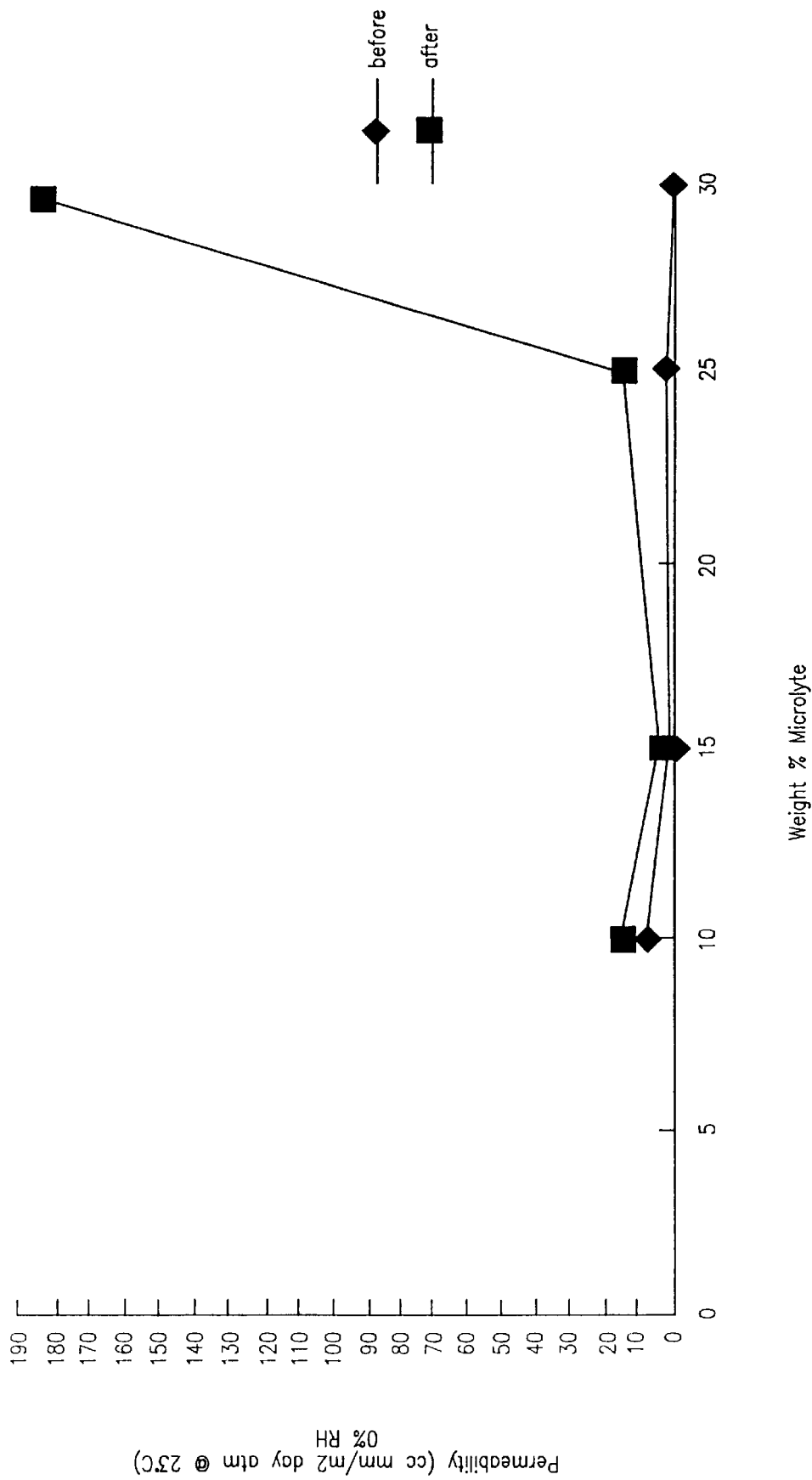
FIG. 6 illustrates flexibility data at 10% elongation, 1 K cycles based on the flex test of Example 17.

The relationship between the percentage of solids in the coating composition to the weight percent of filler in the resulting dried coating is an unexpectedly important issue in obtaining desired barrier coatings of this invention. For example, in embodiments in which the barrier coating composition contains as the elastomeric polymer, butyl rubber (Lord Corporation), and as the filler, MICROLITE 963++ vermiculite solution (W.R. Grace & Co.), FIG. 4 illustrates a range of maximum total solids that can be used in the coatings formulation of this invention without resulting in agglomeration and other negative effects on the dried coating (i.e., film) properties as a function of the fraction of the total solids made up by the filler. In one embodiment, where the MICROLITE filler is at 5%, the maximum solids is about 16%; in another wherein the filler is 25%, the maximum solids is about 9%. In still another embodiment, where the filler is about 50%, the maximum solids is about 5%. Other examples fall within those ranges, as indicated in FIG. 4. The results shown in FIG. 4 are based on the formulations used in Examples 9–12.

The importance of the filler to solids ratio to the performance of the barrier coatings of this invention can be observed by a comparison of the barrier coatings of the examples below. As one comparison, Example 9D describes a barrier coating composition according to this invention, i.e., a formulation with 20% Microlite filler in the final dried film should not exceed 10% solids in the barrier coating mixture; while Example 21 illustrates a coating composition containing MICROLITE filler and butyl rubber, in which the maximum percent solids stipulated in FIG. 4 is exceeded. The barrier coating mixture of Example 21 contains 11.5% solids and 20% Microlite filler in the dried coating. The performance of the barrier film resulting from the composition of Example 21 is substantially lower than that of Example 9D (reduction in permeability: 40.5× with 11.5% solids vs. 104.9× with 10% solids) indicating a lower effective aspect ratio of the filler which results from poorer dispersion at higher % solids.

The unusually low solids contents described in FIG. 4 for a butyl-containing polymer latex are also applicable to other elastomeric polymer latexes, as well as to elastomeric polymers in carrier liquids which also contain other solvents or co-solvents. One of skill in the art will understand the need to make some alterations in the maximums provided by FIG. 4 for other formulations of barrier coatings of this invention taking into account changes in electrolyte concentration, surfactants, grade and composition of vermiculite or other filler, and grade and composition of polymeric latex or other elastomeric polymer in a carrier as described herein.

If desired, the solids content of the barrier coating mixtures can be further adjusted to levels below the maximums shown in FIG. 4 using thickeners, in order to adjust the final film thickness, as well as to adjust the suspension rheology. See, for example, Examples 14–15 which demonstrate the increase in viscosity from 4.5 to 370 using PVOH terpolymer; and Example 16 which similarly increases viscosity using lithium chloride as a thickener. Other conventionally used thickeners may also be useful.

The solids content of the coating mixtures of this invention is preferably based upon a preferred polymer to filler ratio of between about 20:1 to about 1:1, more preferably 9:1 to 1:1, particularly when the polymer is a butyl-containing polymer such as a butyl latex, and the filler is a vermiculite solution. Examples 9–12 indicate a variety of desirable compositions of this invention characterized by a polymer to filler ratios within the above range, over a range of solids contents, polymer contents by weight and filler contents by weight.

Preferably, in the dried barrier coating (film), the polymer is present at between about 45 to about 95 by weight and the dispersed layered filler is present at between about 5 to about 55% by weight.

A. The Elastomeric Polymer

Elastomeric polymers useful in forming coating mixtures of this invention include polymers selected generally from among many classes. The selected polymers may be curable polymers, partially cured polymers, or uncured polymers, and may be soluble in water or a solvent. Such polymers include, without limitation, olefinic thermoplastic elastomer (TPO); polyamide thermoplastic elastomer (Polyamide TPE); polybutadiene thermoplastic elastomer, e.g., syndiotactic 1,2-polybutadiene thermoplastic elastomer (polybutadiene TPE); polyester thermoplastic elastomer (Polyester TPE); polyurethane thermoplastic elastomer (TUPR), for example, thermoplastic polyester-polyurethane elastomer (TPAU), and thermoplastic polyether-polyurethane elastomer (TPEU); styrenic thermoplastic elastomer (Styrenic TPE); vinyl thermoplastic elastomer, e.g., polyvinyl chloride polyol (pPVC).

A variety of rubbery polymers may also be employed as the polymer component of the present invention, including acrylic rubber, such as ethylene-acrylate copolymer (EACM); and butadiene rubber, such as polybutadiene. Butyl-containing polymers useful in forming coating mixtures of this invention include, without limitation, curable, partially cured, or uncured polymers: butyl rubber, such as isobutylene-isoprene copolymer (IIR); bromobutyl rubber, e.g., bromoisobutylene-isoprene copolymer (BIIR); chlorobutyl rubber, e.g., chloroisobutylene-isoprene copolymer (CIIR); and isobutylene rubber. Butyl rubber is defined as a poly(isobutylene) homopolymer or a copolymer of poly (isobutylene) with isoprene. Modified butyl rubbers include halogenated poly(isobutylene) and its copolymers and isoprene. Additional polymers or copolymers that contain more than 50% isobutylene are also useful in the practice of this invention, for example, poly(isobutylene-co-crylonitrile), etc. Other butyl-containing polymers which are cured, partially cured or uncured, may be readily selected by one of skill in the art.

Still other useful elastomeric polymers are chlorosulfonated polyethylene rubber, e.g., chlorosulfonated polyethylene (CSM); epichlorohydrin rubber, such as polyepichlorohydrin (CO), polyepichlorohydrin copolymer (CO copolymer); ethylene-propylene rubber (EPR), such as ethylene-propylene copolymer (EPM), ethylene-propylene-diene copolymer (EPDM).

Other polymers for such use include fluoroelastomers, such as vinylidene fluoride-hexafluoropropylene copolymer (FKM); natural rubber (NR); neoprene rubber such as polychloroprene (CR); nitrile rubber, such as acrylonitrile-butadiene copolymer (NBR); polyisoprene rubber (PI); polysulfide rubber; polyurethane, such as polyester urethane (AU), and polyether urethane (EU); propylene oxide rubber; silicone rubber, such as silicone (MQ), and methylvinyl-fluorosilicone (FVMQ) and styrene-butadiene rubber, such as styrene-butadiene copolymer (SBR).

The polymer is preferably capable of forming a solution, dispersion, latex, suspension or emulsion in water or a solvent, or a mixture thereof. Specifically exemplified below is a coating mixture of the invention employing as the elastomeric polymer, butyl latex. A suitable commercially available butyl latex for use in the compositions of this invention is Lord® BL-100 butyl latex, which is a 62% by weight aqueous butyl latex solution [Lord Corporation]. Another suitable butyl latex, the use of which is illustrated in Example 10, is Polymer Latex ELR butyl latex, a 50% butyl latex solution (Polymer Latex). Still another suitable polymer is a 51.7% bromobutyl latex solution available from Polymer Latex (see Examples 11–12). These latexes contain an ionic surfactant package which stabilizes the latex and effects the performance of the barrier formulation. Other butyl latexes are anticipated to be similarly useful if combined with similar ionic surfactants.

B. The Filler

The coating mixtures of this invention as described above also include a dispersed layered filler which, upon mixture, has an inherently high aspect ratio, which can range from about 25 to as high as about 30,000. The presently preferred filler is vermiculite. More particularly, a desirable vermiculite is MICROLITE® 963++ water-based vermiculite dispersion (W.R. Grace) [see, EP Application No. 601,877, published Jun. 15, 1994] which is a 7.5% by weight aqueous solution of dispersed mica. One novel aspect of the mixtures of the present invention is the effective aspect ratio of the selected filler in the dried coating. According to this invention, in the dried coating, the filler remains substantially dispersed, thereby having a "high effective aspect ratio", as shown in FIG. 1. FIG. 1 assumes high levels of orientation. Preferably, the effective aspect ratio of the filler in the compositions of this invention is greater than 25 and preferably greater than about 100, although higher ratios may also be obtained. In embodiments in which orientation is not high, the effective aspect ratio required for large reductions in permeability will be higher than 100. In the coating mixtures (the liquid), the layered filler is present at between about 1 to about 10% by weight of the total mixture. In the dried coatings of this invention, the layered filler is present at a minimum of about 5% by weight to a maximum of about 55% of the dried coating. The compositions of the present invention, when dried, retain the filler in well-dispersed form, resulting in a high effective aspect ratio of the dried coating, and greatly increased reduction in permeability, as illustrated in FIG. 1.

MICROLITE vermiculite is the preferred filler because of its very high aspect ratio. The vermiculite plates have an average lateral size of between 10 and 30 microns. The plates are largely exfoliated in water, and thus their thickness is 1–2 nm. The aspect ratio of the filler in water dispersion is an average of 10,000–30,000. It is clear that many plates reassemble during the coating and drying process of the present invention, thus reducing the effective aspect ratio achieved in the final coating. However, it is a great advantage to start with as large an aspect ratio as possible.

The importance of aspect ratio of the filler selected for use in the barrier coating mixture of this invention is demonstrated by comparing the results of several of the examples below, i.e., Example 9C vs. Example 22. Example 22 exemplifies a barrier coating formulation utilizing a lower aspect ratio filler, e.g., aluminum flake filler dispersed in a barrier coating mixture in place of Microlite 963++ of Example 9C. Since the aspect ratio of the aluminum flake filler (25) is much lower than that of Microlite 963++ (10000–30000), the barrier properties of the resulting film were also substantially reduced (4.8× vs. 45.4×). Therefore, even though aluminum is a plate-like filler, the aspect ratio of 25 is too low to achieve the barrier results seen with high aspect ratio exfoliated vermiculite (Microlite 963++). Thus, the platelet filler selected for use in the present invention must have an aspect ratio greater than 25, and preferably, much greater than 25, e.g., 10,000 or higher.

Although MICROLITE 963++ vermiculite (W. R. Grace) is preferred, good results may also be achieved with less exfoliated grades of MICROLITE vermiculite (i.e., grades 963, 923, and 903). Other layered silicates are also useful in the barrier coatings and films of this invention. The effectiveness of other silicates in the barrier coating of this invention depends upon the lateral size of the platelets, the degree of exfoliation in water, and the degree to which they reassemble to form larger particles during the coating and drying process. Examples of other layered silicates include bentonite, vermiculite, montmorillonite, nontronite, beidellite, volkonskoite, hectorite, saponite, laponite, sauconite, magadiite, kenyaite, ledikite and mixtures of the above silicates. The selection and use of other known silicates which have properties similar to those of MICROLITE vermiculite, as well as sufficiently high aspect ratios, are expected to be obvious to one of skill in the art following the teachings of this invention.

C. Surfactants and Other Additives

Coating mixtures of this invention also contain at least one or more than one suitable surfactant to reduce surface tension. Surfactants include materials otherwise known as wetting agents, anti-foaming agents, emulsifiers, dispersing agents, leveling agents etc. Surfactants can be anionic, cationic and nonionic, and many surfactants of each type are available commercially. A suitable surfactant for inclusion in these compositions possesses a critical micelle concentration sufficiently low to ensure a dried coating uncompromised by residual surfactant. Preferably, the surfactant(s) useful in the methods and solutions of this invention are nonionic, particularly useful with a highly charged filler, such as vermiculite. In the event of an unfavorable interaction of the anionic emulsifier present in the butyl latex dispersion [Lord], which is a presently preferred source of the butyl-containing polymer, any additional ionic additives must be kept to a minimum. This variable is eliminated where the surfactant or emulsifier is non-ionic. Increase in ionic concentration of the compositions containing vermiculite, such as by the addition of a base to adjust pH, e.g., LiOH, $NH_4OH$ and NaOH can cause agglomeration of the filler, which adversely affects permeability reduction.

Some embodiments of this invention include at least two surfactants, which include preferably both a wetting agent and an anti-foaming agent. Still other compositions may have additional surfactants to perform additional effects. Desirable surfactants employed in the examples below are the non-ionic siloxane-based, Silwet® L-77 wetting agent [OSI Specialties, Inc.], the BYK®-306 wetting/leveling agent [BYK Chemie], FOAMASTER® VL defoamer (Henkel), and the DC200® anti-foaming agent [Dow Corning], among others. As exemplified below, an antifoaming agent may be predispersed in solution with, e.g., 1-methyl-2-pyrrolidinone (NMP) because some antifoaming agents are not soluble in the barrier coating.

Other suitable surfactants may also be selected. The amount and number of surfactants added to the coating solution or composition will depend on the particular surfactant(s) selected, but should be limited to the minimum amount of surfactant that is necessary to achieve wetting of the substrate while not compromising the performance of the dried coating. For example, typical surfactant amounts can be less than or equal to about 10% by weight of the dried coating.

The inventors have noted that the amount of anti-foaming agent present in the compositions in which the polymer is a butyl rubber can significantly affect permeability. For example, an increase from 0.5 ppm to 1 ppm can double permeability of a butyl latex/vermiculite mixture. The inventors have found that the amounts of these optional components can be adjusted to obtain a desired permeability reduction. One desirable range for an anti-foaming surfactant in a dried coating of this invention is from about 0.0001% to about 1.0% by weight.

Similarly, other optional components of the coating mixture include conventional agents to adjust pH to between about 8 to about 11, such as $NH_4OH$, NaOH or LiOH provided that care is taken to avoid agglomeration, as discussed above.

In another embodiment, thickeners may be used in the coating formulations to adjust viscosity. Such thickeners may include, without limitation, a polyvinyl alcohol (PVOH) terpolymer, e.g., polyvinylbutyral/polyvinylacetate/polyvinylalcohol or a lithium chloride thickener. In one embodiment, the viscosity of the coating mixture can be increased from 4.5 cP to 370 cP with the addition of the PVOH terpolymer to the formulation as illustrated in Examples 14–15. For example, for a coating mixture containing 10% total solids with 2% MICROLITE vermiculite formulation, a thickener such as PVOH terpolymer can be added in an amount of between about 3% to about 5.5% by weight. Desirably the thickener is added in an amount of greater than 3.5% by weight. A preferred range of thickener is between about 5 and 5.5% by weight. It has been noted that greater than 5.5% by weight of PVOH terpolymer thickener can cause agglomeration of the filler platelets. As another example, the viscosity of the coating mixture can also be increased with the addition of lithium chloride as a thickener to the coating mixture, (See e.g., Example 16). For example, for a coating mixture containing 10% total solids with 2% MCROLITE, the thickener is employed in an amount between about 3% to about 5% by weight. Desirably greater than 4% thickener is employed, and more desirably 5% thickener is employed. Greater than 5% by weight of the lithium chloride thickener produces poor barrier properties. One of skill in the art would readily determine and adjust the type and amounts of thickener depending on the type and amount of filler employed in the coating mixture based on the teachings contained herein.

Still other optional components of the barrier coating are components which effect curing of the coating. For example, one type of cure "package" contains about 10 to about 30% by weight zinc oxide, about 5 to about 20% by weight sulfur, about 30 to about 60% by weight water, about 0.1 to about 10% of a dispersing agent, about 5 to about 20% of zinc dibutyldithio-carbamate and about 1 to about 10% zinc 2-mercaptobenzothiazole. The amount of cure package added to the coating mixture is based on the amount of butyl rubber in the coating mixture. In one embodiment, greater than 10 parts dried cure package is added per 100 parts butyl rubber in the coating mixture. A desirable amount of dried cure package is about 15 parts cure package per 100 parts butyl rubber in the mixture. One of skill in the art can readily design a cure "package" to enhance the curing of a butyl latex barrier coating mixture of this invention, and select a desirable amount to be added to the coating mixture, based on the teachings of this specification combined with the knowledge of the art. See, e.g., U.S. Pat. No. 4,344,859.

D. The Carrier Liquid

The coating mixtures of this invention are present in a suitable carrier liquid. Carriers which are suitable for use in the composition of this invention include, without limitation, water and solvents such as hexane, heptane, toluene, 1-methyl-2-pyrrolidinone, cyclohexanone, ethanol, methanol, and other hydrocarbons. Combinations of water with an organic carrier may also be used as the carrier liquid. Selection of a suitable organic solvent carrier is within the skill of the art.

E. Embodiments of Barrier Mixtures

One example of a barrier coating mixture useful for application to a tire or tire surface or interface according to this invention comprises coating formed by a barrier coating mixture comprising in a carrier liquid: (a) an elastomeric polymer; (b) a dispersed exfoliated layered platelet filler having an aspect ratio greater than 25; and (c) at least one surfactant, wherein the solids content of said mixture is less than 30% and the ratio of polymer (a) to filler (b) is between 20:1 and 1:1. These barrier coating mixtures result in films with reductions in permeability of 5× to 2300× relative to the unfilled polymer. These results are substantially higher than the prior art on other platelet filled barrier coatings.

Another barrier coating mixture which is desirable for application to tire surfaces and interfaces according to this invention includes the following components in a carrier liquid, (a) a butyl-containing polymer latex; (b) a dispersed exfoliated layered vermiculite filler having an aspect ratio about 1000 or greater; and (c) at least one surfactant. The solids content of the mixture is less than 17% and the ratio of polymer (a) to filler (b) is between 20:1 and 1:1.

In a preferred embodiment, the coating mixtures described above have solids contents of between about 5 to about 15% by weight, and form dried coatings on said tire surface that comprise between about 45% to about 95% by weight of the polymer, between about 5% to about 55% by weight of the filler, and between about 1.0% to about 10% by weight of the surfactant(s). The dried coatings of the mixtures described above, contain fillers which preferably exhibit an effective aspect ratio of greater than about 25, reduces the gas, vapor or chemical permeability greater than 5-fold that of the dried, unfilled polymer alone. Preferably, the effective aspect ratio of the dried coatings is greater than about 50, and even greater than about 100.

One preferred coating mixture useful in this invention has a solids contents of between about 5 to about 15% by weight and the dried coating comprises between about 65% to about 90% by weight of a butyl-containing polymer latex, between about 10% to about 35% by weight of a vermiculite filler, between about 0.1% to about 0.10% by weight an antifoaming agent as surfactant, with the total surfactant weight percent up to about 15%. As described in examples below, the selected polymer is the elastomer butyl rubber or butyl latex, e.g., Lord® BL-100 butyl latex in a 62% by weight aqueous butyl latex solution [Lord Corporation]. Additional preferred barrier coating mixtures useful in this invention may be prepared by methods described in detail in Examples 1–12 and 14–16.

III. The Coated Article

Once prepared as described in detail in Examples 1–12 and 14–16 below, the coating mixtures may be applied to a suitable substrate to reduce the permeability of the substrate to gas, vapor or chemical. In the dried coating, more preferably, the polymer is present in the mixture when dried at a weight percent of at least about 50%. The filler is preferably present in said mixture when dried at greater than about 5% by weight. The dried coating, in which the filler exhibits an effective aspect ratio of greater than about 25, reduces the gas, vapor or chemical permeability greater than 5-fold that of the dried, unfilled polymer alone. Preferably, the effective aspect ratio of the dried coating is greater than about 50, and even greater than about 100. As indicated in Examples 1–12, reductions in permeability attributed to compositions of this invention can range from approximately 5× to about 2300× that of unfilled polymer alone.

Desirable substrates for coating with the coating mixtures of this invention may be flexible and/or elastomeric substrates, optionally under pressure. Examples of flexible or elastomeric substrates include balloons, gloves, dirigibles, tires for bicycles, automobiles and trucks, etc., and tire layers, prophylactics, pressure accumulators, regulators and actuators, diaphragms and membrane, as discussed above.

The articles to be coated by the compositions of the invention may be previously untreated or may have a variety of pre-treatments to their surfaces, depending upon the identity and utility of the article. For example, the article may have on at least one side a heat seal layer. Such heat seal layers may be made of an ethylene-propylene copolymer or ethylene-propylene-butylene terpolymer. Thus, the coating solution is applied on the surface of the heat seal layer. Alternatively, the substrate or article may comprise a protective topcoat layer, such as polyurethane or Teflon®-type materials [DuPont] for abrasion resistance, etc. Such topcoats may be selected by one of skill in the art. The coatings of this invention may be applied over or under the topcoat layer.

Alternatively, the coating mixtures of the invention may be applied to a releasable mold in order to form a film, rather than a coated article. The film thus consists of a dried mixture of the above-described polymer and greater than 2% by volume of the layered filler having an aspect ratio greater than 25. The film, which may be in the form of a membrane, may itself be employed as a vapor, gas or chemical barrier layer for use in various laboratory procedures, or as a glove or balloon material. Such a dried, free-standing film or membrane, is characterized by a reduction in gas, vapor or chemical permeability greater than 5-fold the permeability of a film formed of the dried polymer alone.

To form the coated article or free-standing film of this invention, the coating mixtures of this invention may be applied to the selected surface or article by techniques including, without limitation, roll coating, spray coating, brush coating and dip coating techniques. Roll coating techniques include, but are not limited to, rod, reverse roll, forward roll, air knife, knife over roll, blade, gravure and slot die coating methods. General descriptions of these types of coating methods may be found in texts, such as *Modern Coating and Drying Techniques,* (E. Cohen and E. Gutoff, eds; VCH Publishers) New York (1992) and *Web Processing and Converting Technology and Equipment,* (D. Satas, ed; Van Nostrand Reinhold) New York (1984). Three dimensional articles may preferably be coated by the techniques which include, but are not limited to, spray coating or dip coating. The method of application is not a limitation on the present invention, but may be selected from among these and other well-known methods by the person of skill in the art. However, the coating must be applied so that drying takes place on the substrate and not in the air (i.e. powder coating). If drying takes place during spraying or other means of application, agglomeration may occur.

The coating mixtures may be applied to a substrate or a mold at any desired thickness, depending on the substrate, the purpose for which the coating is being applied and the ultimate use of the coated article. Thus, for example, the coating mixtures of the present invention may be applied to an article or substrate by the methods described above to form a dried coating of a thickness between about 0.1 μm to about 100 μm of dry coating. Such adjustments are well within the skill of the art [see, e.g., Canadian Patent No. 993,738].

After coating, the coated article or mold may be dried at a selected temperature, e.g., room temperature or greater than room temperature. The selection of the drying temperature, relative humidity, and convective air flow rates depends on the desired time for drying; that is, reduced drying times may be achieved at elevated air temperatures, lower relative humidity and higher rates of air circulation over the drying coating surface. After drying, the exfoliated silicate filler particles are oriented within the elastomeric latex (solution, emulsion, etc.) to a high degree parallel to each other and to the substrate surface. One of skill in the art can readily adjust the drying conditions as desired. The performance of the dried barrier coating is insensitive to drying temperatures over the range 25–160° C.

The dried coatings exhibit a surprising reduction in permeability compared to the prior art and particularly compared to unfilled polymers. As evidenced in the Examples below, reductions in permeability caused by the dried coatings of this invention are shown to be from about 7 fold to almost 2300 fold relative to the unfilled polymers alone. The evaluation of permeability of the coatings of the present invention are determined using the following parameters. The oxygen transmission rate (OTR) of the dried coating on the article, or the free-standing film, is generally measured using conventional apparatus, such as a MOCON® OX-TRAN 2/20 module. OTR units are $cc/m^2$ day at 1 atmosphere, 0% relative humidity at 23° C. The permeability of the coating is calculated by multiplying the OTR and coating thickness. Permeability units are cc $mm/m^2$ day atmosphere at 0% relative humidity at 23° C. If the coating is on a known substrate, the permeability of the known substrate is subtracted out using the following equation:

Permeability of the barrier coating=$X_1/[(1/OTR)-(X_2/P_{X2})]$, where $X_1$ is barrier coating thickness; $X_2$ is substrate thickness and $P_{X2}$ is permeability of the substrate. The reduction in permeability from the unfilled polymer is calculated by dividing the permeability of the unfilled polymer by the permeability of the filled polymer. Reduction in permeability is unitless.

The dried coating preferably maintains its low permeability after repeated mechanical loading and elongation up to about 10% of the substrate. The evaluation of the coating integrity after exposure to repeated loading and elongation was examined as described below in Example 17.

The coatings of the present invention may be used to produce all types of pneumatic tires to maintain or improve air retention, and may also increase longevity and reduce or replace the butyl rubber content of such tires. The coatings of this invention may be used to replace about 0.5–3 mm of butyl rubber in a tire with between about 1–100 μm of coating, as taught, for example, in Examples 18–20. The coatings of this invention may also be modified as described above with suitable curatives (e.g., cure packages) in the manner taught in Example 16. Similarly, when on the tire, the coatings may be subjected to vulcanization or pre-vulcanization conditions as discussed in the examples below.

The invention is illustrated by the following examples, which are not intended to limit the scope of this invention.

EXAMPLE 1
Barrier Coating

An aqueous elastomeric barrier coating solution according to this invention is prepared as follows, in which the elastomer is butyl latex (MW=600,000) and the filler is MICROLITE® dispersed mica.

In a 50 mL beaker, 0.7 g BYK®-306 wetting agent (a polyether modified dimethyl polysiloxane copolymer) [BYK Chemie], 4.4 g 1N NH$_4$OH and 20.5 g distilled water are stirred into solution on a stir plate with a stir bar. 18.9 g Lord® BL-100 butyl latex in a 62% by weight aqueous butyl latex solution [Lord Corporation] is placed in a glass jar, and the solution is slowly added to the butyl latex with stirring. The resulting solution is Solution A.

In a 10 mL beaker, a premix to disperse the antifoaming agent in a water soluble solvent is made by mixing 0.125 g of solvent 0.04% by weight 1-methyl-2-pyrrolidinone (NMP) solution and DC200® Fluid®, 1000 cs [Dow Corning] and 1.5 g 1N NH$_4$OH. This solution is added with stirring with a stir bar on a stir plate to a separate 100 mL beaker containing 17.3 g MICROLITE® 963++ dispersed mica in a 7.5% by weight aqueous solution [W. R. Grace]. Distilled water (36.3 g) is added to the resulting solution, which is referred to as Solution B.

Solution B is slowly added into stirred Solution A with maximum stirring on the stir plate. High shear stirring is not used. The resulting dispersion at room temperature is ready for application, e.g., spray-coating, onto a plastic or rubber substrate. The coating mixture has a 13.7% solids in water content.

After this coating solution is applied to a polypropylene film substrate and allowed to dry, the coating contains 85.4% by weight butyl rubber, 9.5% by weight filler, 5.1% BYK wetting agent, and 0.0003% by weight DC200® antifoaming agent (a linear polydimethylsiloxane polymer) [Dow Corning].

The oxygen transmission rate (OTR) is measured using a MOCON® OX-TRAN 2/20 module. The OTR is 239.6 $cc/m^2$ day @ 1 atmosphere, 0% RH, 23° C. Permeability of the composition is 5.2 cc $mm/m^2$ day atmosphere @ 0% RH, 23° C. The reduction in permeability of this coating is 18.1 times the reduction in permeability of the unfilled butyl latex.

EXAMPLE 2
Barrier Coating

Another aqueous elastomeric barrier coating solution according to this invention is prepared as follows, in which the elastomer is butyl latex (MW=600,000) and the filler is MICROLITE® dispersed mica at 5% by weight.

In a 50 mL beaker, 0.5 g BYK® (BYK Chemie), 5.3 g 1N NH$_4$OH and 16 g distilled water are weighed and mixed and the resulting solution stirred on a stir plate with a stir bar. In a 2 oz glass jar, 23 g of Lord® BL-100 Butyl Latex (62% butyl latex solution, Lord Corporation) is weighed. Slowly the solution in the 50 mL beaker is added into the butyl latex solution while manually stirring. This is Solution A, which is then set aside without stirring.

In a 10 mL beaker, 0.125 g of 0.04% NMP solution, DC 200® Fluid, 1000 cs (Dow Corning) and 1.5 g 1N NH$_4$OH are mixed together. In a separate 100 mL beaker 10 g of MICROLITE® 963++ filler (7.5% solution, W.R. Grace) is weighed. The solution from the 10 mL beaker is added into the MICROLITE® filler while stirring with a stir bar on a stir plate. 43.4 g of distilled water is added to the resulting Solution B in the 100 mL beaker.

Solution A is then stirred, and Solution B is slowly added into Solution A with maximum stirring on the stir plate (not high shear stirring). The resulting mixture has 15.5% solids in water.

After this coating solution is applied to a polypropylene film substrate and allowed to dry, the coating contains 92.0% by weight butyl latex, 4.8% MICROLITE filler, 3.2% BYK 306 surfactant and 0.0003% DC200® surfactant. The oxygen transmission rate (OTR) is measured using a MOCON® OX-TRAN 2/20 module. The OTR is 284.6 $cc/m^2$ day @ 1 atmosphere, 0% RH, 23° C. Permeability of the composition is 14.2 cc $mm/m^2$ day atmosphere @ 0% RH, 23° C. The reduction in permeability of this coating is 6.6 times the reduction in permeability of the unfilled butyl latex.

EXAMPLE 3

Barrier Coating

Yet another aqueous elastomeric barrier coating solution according to this invention is prepared as follows, in which the elastomer is butyl latex (MW=600,000) and the filler is MICROLITE® dispersed mica at 15% by weight.

Solution A: In a 50 mL beaker, 0.32 g BYK®-306 (BYK Chemie), 3.5 g 1N $NH_4OH$ and 26.1 g distilled water are mixed. The resulting solution is stirred on a stir plate with a stir bar. In a 2 oz glass jar, 15.1 g of Lord® BL-100 Butyl Latex (62% butyl latex solution, Lord Corporation) is weighed out. Slowly the solution in the 50 mL beaker is added into the butyl latex solution while manually stirring. The resulting Solution A is set aside without stirring.

Solution B: In a 10 mL beaker 0.04 g of 0.04% NMP solution with DC 200® Fluid, 1000 cs (Dow Corning) and 1.5 g 1N $NH_4OH$ are mixed. In a separate 100 mL beaker 22.0 g of MICROLITE® filler is weighed, while stirring with a stir bar on a stir plate. Distilled water (31.5 g) is added to the resulting solution in the 100 mL beaker.

Solution A is stirred and Solution B is slowly added into Solution A with maximum stirring on the stir plate (without high shear stirring). The resulting mixture has 11.3% solids in water content.

After this coating solution is applied to a polypropylene film substrate and allowed to dry, the coating contains 82.6% by weight butyl rubber, 14.6% by weight MICROLITE filler, 2.8% by weight BYK 306 surfactant and 0.00014% by weight DC200 surfactant.

The oxygen transmission rate (OTR) is measured using a MOCON® OX-TRAN 2/20 module. The OTR is 102.6 $cc/m^2$ day @ 1 atmosphere, 0% RH, 23° C. Permeability of the composition is 2.99 cc $mm/m^2$ day atmosphere @ 0% RH, 23° C. The film which results from this dried coating mixture provides a reduction in permeability of 31.4 times that of the unfilled polymer.

EXAMPLE 4

Barrier Coating

Yet another aqueous elastomeric barrier coating solution according to this invention is prepared as follows, in which the elastomer is butyl latex (MW=600,000) and the filler is MICROLITE® dispersed mica at 20% by weight.

Solution A: In a 50 mL beaker, 0.5 g BYK®-306 (BYK Chemie), 3.0 g 1N $NH_4OH$ and 28.6 g distilled water are added and the resulting solution stirred on a stir plate with a stir bar. In a 2 oz glass jar, 12.9 g of Lord® BL-100 Butyl Latex (62% butyl latex solution, Lord Corporation) is weighed out. Slowly the solution in the 50 mL beaker is added into the butyl latex solution while manually stirring. This Solution A is set aside without stirring.

Solution B: In a 10 mL beaker, 0.0625 g of 0.04% NMP solution of DC200® Fluid, 1000 cs (Dow Corning) and 1.5 g 1N $NH_4OH$ are mixed together. In a separate 100 mL beaker 26.7 g of MICROLITE® 963++ filler (7.5% solution, W.R. Grace) is weighed out. The solution from the 10 mL beaker is added into the MICROLITE® filler while stirring with a stir bar on a stir plate. 26.8 g of distilled water is added to the resulting solution in the 100 mL beaker.

Solution A is stirred and Solution B is slowly added to it with maximum stirring on the stir plate without high shear stirring. The resulting coating mixture contains 10.5% solids in water.

After this coating solution is applied to a polypropylene film substrate and allowed to dry, the coating contains 76.2% by weight butyl rubber, 19.1% by weight MICROLITE filler, 4.7% BYK 306 surfactant, and 0.00024% DC200 surfactant.

The oxygen transmission rate (OTR) is measured using a MOCON® OX-TRAN 2/20 module. The OTR is 89.4 $cc/m^2$ day @ 1 atmosphere, 0% RH, 23° C. Permeability of the composition is 2.04 cc $mm/m^2$ day atmosphere @ 0% RH, 23° C. The film which results from this dried coating mixture provides a reduction in permeability of 46.1 times that of the unfilled polymer.

EXAMPLE 5

Barrier Coating

Yet another aqueous elastomeric barrier coating solution according to this invention is prepared as follows, in which the elastomer is butyl latex (W=600,000) and the filler is MICROLITE® dispersed mica at 25% by weight.

Solution A: In a 50 mL beaker, 0.5 g BYK®-306 (BYK Chemie), 2.5 g 1N $NH_4OH$ and 31.1 g distilled water are added and the resulting solution stirred on a stir plate with a stir bar. In a 2 oz glass jar, 10.9 g of Lord® BL-100 Butyl Latex (62% butyl latex solution, Lord Corporation) is weighed out. Slowly the solution in the 50 mL beaker is added into the butyl latex solution while manually stirring. This Solution A is set aside without stirring.

Solution B: In a 10 mL beaker, 0.0625 g of 0.04% NMP solution of DC200® Fluid, 1000 cs (Dow Corning) and 1.5 g 1N $NH_4OH$ are mixed together. In a separate 100 mL beaker 30.0 g of MICROLITE® 963++ filler (7.5% solution, W.R. Grace) is weighed out. The solution from the 10 mL beaker is added into the MICROLITE® filler while stirring with a stir bar on a stir plate. 23.5 g of distilled water is added to the resulting solution in the 100 mL beaker.

Solution A is stirred and Solution B is slowly added to it with maximum stirring on the stir plate without high shear stirring. The resulting coating mixture contains 9.5% solids in water.

After this coating solution is applied to a polypropylene film substrate and allowed to dry, the coating contains 70.9% by weight butyl rubber, 23.8% by weight MICROLITE filler, 5.3% BYK 306 surfactant, and 0.00026% DC200 surfactant.

The oxygen transmission rate (OTR) is measured using a MOCON® OX-TRAN 2/20 module. The OTR is 40.2 $cc/m^2$ day @ 1 atmosphere, 0% RH, 23° C. Permeability of the composition is 1.0 cc $mm/m^2$ day atmosphere @ 0% RH, 23° C. The film which results from this dried coating mixture provides a reduction in permeability of 88.3 times that of the unfilled polymer.

EXAMPLE 6

Barrier Coating

Yet another aqueous elastomeric barrier coating solution according to this invention is prepared as follows, in which the elastomer is butyl latex (MW=600,000) and the filler is MICROLITE® dispersed mica at 30% by weight.

Solution A: In a 50 mL beaker, 0.5 g BYK®-306 (BYK Chemie), 2.5 g 1N $NH_4OH$ and 31.3 g distilled water are added and the resulting solution stirred on a stir plate with a stir bar. In a 2 oz glass jar, 10.7 g of Lord® BL-100 Butyl Latex (62% butyl latex solution, Lord Corporation) is weighed out. Slowly the solution in the 50 mL beaker is added into the butyl latex solution while manually stirring. This Solution A is set aside without stirring.

Solution B: In a 10 mL beaker, 0.0625 g of 0.04% NMP solution of DC200® Fluid, 1000 cs (Dow Corning) and 1.5 g 1N $NH_4OH$ are mixed together. In a separate 100 mL beaker 38.0 g of MICROLITE® 963++ filler (7.5% solution, W.R. Grace) is weighed out. The solution from the 10 mL beaker is added into the MICROLITE® filler while stirring with a stir bar on a stir plate. 15.5 g of distilled water is added to the resulting solution in the 100 mL beaker.

Solution A is stirred and Solution B is slowly added to it with maximum stirring on the stir plate without high shear stirring. The resulting coating mixture contains 10% solids in water.

After this coating solution is applied to a polypropylene film substrate and allowed to dry, the coating contains 66.3% by weight butyl rubber, 28.7% by weight MICROLITE filler, 5.0% BYK 306 surfactant, and 0.00025% DC200 surfactant.

The oxygen transmission rate (OTR) is measured using a MOCON® OX-TRAN 2/20 module. The OTR is 32.6 cc/m$^2$ day @ 1 atmosphere, 0% RH, 23° C. Permeability of the composition is 0.55 cc mm/m$^2$ day atmosphere @ 0% RH, 23° C. The film which results from this dried coating mixture provides a reduction in permeability of 110.6 times that of the unfilled polymer.

EXAMPLE 7
Barrier Coating

Yet another aqueous elastomeric barrier coating solution according to this invention is prepared as follows, in which the elastomer is butyl latex (MW=600,000) and the filler is MICROLITE® dispersed mica at 35% by weight.

Solution A: In a 50 mL beaker, 0.5 g BYK®-306 (BYK Chemie), 1.16 g 1N NH$_4$OH and 35.0 g distilled water are added and the resulting solution stirred on a stir plate with a stir bar. In a 2 oz glass jar, 8.4 g of Lord® BL-100 Butyl Latex (62% butyl latex solution, Lord Corporation) is weighed out. Slowly the solution in the 50 mL beaker is added into the butyl latex solution while manually stirring. This Solution A is set aside without stirring.

Solution B: In a 10 mL beaker, 0.125 g of 0.04% NMP solution of DC200 Fluid, 1000 cs (Dow Corning) and 1.5 g 1N NH$_4$OH are mixed together. In a separate 100 mL beaker 37.3 g of MICROLITE® 963++ filler (7.5% solution, W.R. Grace) is weighed out. The solution from the 10 mL beaker is added into the MICROLITE® filler while stirring with a stir bar on a stir plate. 16.5 g of distilled water is added to the resulting solution in the 100 mL beaker.

Solution A is stirred and Solution B is slowly added to it with maximum stirring on the stir plate without high shear stirring. The resulting coating mixture contains 8.5% solids in water.

After this coating solution is applied to a polypropylene film substrate and allowed to dry, the coating contains 61.2% by weight butyl rubber, 32.9% by weight MICROLITE filler, 5.9% BYK 306 surfactant, and 0.00059% DC200 surfactant.

The oxygen transmission rate (OTR) is measured using a MOCON® OX-TRAN 2/20 module. The OTR is 26.8 cc/m$^2$ day @ 1 atmosphere, 0% RH, 23° C. Permeability of the composition is 0.55 cc mm/m$^2$ day atmosphere @ 0% RH, 23° C. The film which results from this dried coating mixture provides a reduction in permeability of 171 times that of the unfilled polymer.

EXAMPLE 8
Barrier Coating

Yet another aqueous elastomeric barrier coating solution according to this invention is prepared as follows, in which the elastomer is butyl latex (MW=600,000) and the filler is MICROLITE® dispersed mica at 18.7% by weight.

Solution A: In a 500 mL beaker, 7.0 g BYK®-306 (BYK Chemie), 17.9 g 1N NH$_4$OH and 296.1 g distilled water are added and the resulting solution stirred on a stir plate with a stir bar. In a 16 oz. glass jar, 129 g of Lord® BL-100 Butyl Latex (62% butyl latex solution, Lord Corporation) is weighed out. Slowly the solution in the 500 mL beaker is added into the butyl latex solution while manually stirring. This Solution A is set aside without stirring.

Solution B: In a 100 mL beaker, 1.25 g of 0.04% NMP solution of DC200® Fluid, 1000 cs (Dow Corning) and 8 g 1N NH$_4$OH are mixed together. In a separate 1000 mL beaker 266.7 g of MICROLITE® 963++ filler (7.5% solution, W.R. Grace) is weighed out. The solution from the 100 mL beaker is added into the MICROLITE® filler while stirring with a stir bar on a stir plate. 274 g of distilled water is added to the resulting solution in the 1000 mL beaker.

Solution A is stirred and Solution B is slowly added to it with maximum stirring on the stir plate without high shear stirring. The resulting coating mixture contains 8.5% solids in water.

After this coating solution is applied to a polypropylene film substrate and allowed to dry, the coating contains 74.8% by weight butyl rubber, 18.7% by weight MICROLITE filler, 6.5% BYK 306 surfactant, and 0.00047% DC200 surfactant.

The oxygen transmission rate (OTR) is measured using a MOCON® OX-TRAN 2/20 module. The OTR is 123.2 cc/m$^2$ day @ 1 atmosphere, 0% RH, 23° C. Permeability of the composition is 2.96 cc mm/m$^2$ day atmosphere @ 0% RH, 23° C. The film which results from this dried coating mixture provides a reduction in permeability of 31.6 times that of the unfilled polymer.

EXAMPLE 9
Barrier Coating Compositions Which Vary % MICROLITE® Vermiculite with % Solids A. 16.0% Solids in Water: 95% butyl latex, 5% MICROLITE® filler Part A: In a 4 oz glass jar, 24.7 g of Lord® BL-100 Butyl Latex (61.6% butyl latex solution, Lord Corporation) is measured. This latex is stirred slowly with a stir bar on a stir plate. In a 30 mL beaker, 0.1 g BYK®-306 wetting agent (BYK Chemie), 3.4 g of 1N NH$_4$OH and 16.8 g distilled water are mixed into solution, and the solution in the 30 mL beaker is slowly added into the butyl latex solution while stirring slowly.

Part B: In a 50 mL beaker, 44.0 g distilled water and 0.32 g 1N NH$_4$OH are mixed. In a separate 100 mL beaker 10.7 g of MICROLITE® 963++ filler (7.5% solution, W. R. Grace) is measured, and the solution from the 50 mL beaker is added into the MICROLITE® filler while stirring with a stir bar on a stir plate.

Slowly Part B is added into Part A with medium stirring on the stir plate, avoiding high shear stirring.

A barrier film (21.5 microns) is formed on polypropylene from the above coating solution. The film results in an OTR of 386.1 cc/m$^2$ day @ 1 atm, 23° C., 0% RH, and a permeability of 15.3 cc mm/m$^2$ day atm @ 23° C., 0% RH, which results in a reduction in permeability of 6.2×. The butyl/filler ratio equals 19.0:1.

B. 15.0% Solids in Water: 90% butyl latex, 10 % MICROLITE® filler

Part A: In a 4 oz glass jar, 21.9 g of Lord® BL-100 Butyl Latex (61.6% butyl latex solution, Lord Corporation) is measured. This latex is stirred slowly with a stir bar on a stir plate. In a 30 mL beaker, 0.1 g BYK®-306 wetting agent (BYK Chemie), 3.1 g of 1N NH$_4$OH and 19.9 g distilled water are mixed into solution, and the solution in the 30 mL beaker is slowly added into the butyl latex solution while stirring slowly.

Part B: In a 50 mL beaker, 34.4 g distilled water and 0.6 g 1N NH$_4$OH are mixed. In a separate 100 mL beaker 20.0 g of MICROLITE® 963++ filler (7.5% solution, W. R. Grace) is measured, and the solution from the 50 mL beaker is added into the MICROLITE® filler while stirring with a stir bar on a stir plate.

Slowly Part B is added into Part A with medium stirring on the stir plate, avoiding high shear stirring.

A barrier film (22 microns) is formed on polypropylene from the above coating solution. The film results in an OTR of 166.5 cc/m$^2$ day @ 1 atm, 23° C., 0% RH, and a permeability of 4.57 cc mm/m$^2$ day atm @ 23° C., 0% RH, which results in a reduction in permeability of 20.7×. The butyl/filler ratio equals 9.0:1.

C. 12.0% Solids in Water: 85% butyl latex, 15% MICROLITE® filler

Part A: In a 4 oz glass jar, 16.5 g of Lord® BL-100 Butyl Latex (61.6% butyl latex solution, Lord Corporation) is measured. This latex is stirred slowly with a stir bar on a stir plate. In a 30 mL beaker, 0.1 g BYK®-306 wetting agent (BYK Chemie), 2.3 g of 1N NH$_4$OH and 26.1 g distilled water are mixed into solution, and the solution in the 30 mL beaker is slowly added into the butyl latex solution while stirring slowly.

Part B: In a 50 mL beaker, 30.3 g distilled water and 0.7 g 1N NH$_4$OH are mixed. In a separate 100 mL beaker 24.0 g of MICROLITE® 963++ filler (7.5% solution, W. R. Grace) is measured, and the solution from the 50 mL beaker is added into the MICROLITE® filler while stirring with a stir bar on a stir plate.

Slowly Part B is added into Part A with medium stirring on the stir plate, avoiding high shear stirring.

A barrier film (16.75 microns) is formed on polypropylene from the above coating solution. The film results in an OTR of 108.1 cc/m$^2$ day @ 1 atm, 23° C., 0% RH, and a permeability of 2.08 cc mm/m$^2$ day atm @ 23° C., 0% RH, which results in a reduction in permeability of 45.4×. The butyl/filler ratio equals 5.65:1.

D. 10.0% Solids in Water: 80% butyl latex, 20% MICROLITE® filler

Part A: In a 4 oz glass jar, 13.0 g of Lord® BL-100 Butyl Latex (61.6% butyl latex solution, Lord Corporation) is measured. This latex is stirred slowly with a stir bar on a stir plate. In a 30 mL beaker, 0.1 g BYK®-306 wetting agent (BYK Chemie), 1.8 g of 1N NH$_4$OH and 30.1 g distilled water are mixed into solution, and the solution in the 30 mL beaker is slowly added into the butyl latex solution while stirring slowly.

Part B: In a 50 mL beaker, 27.5 g distilled water and 0.8 g 1N NH$_4$OH are mixed. In a separate 100 mL beaker 26.7 g of MICROLITE® 963++ filler (7.5% solution, W. R. Grace) is measured, and the solution from the 50 mL beaker is added into the MICROLITE® filler while stirring with a stir bar on a stir plate.

Slowly Part B is added into Part A with medium stirring on the stir plate, avoiding high shear stirring.

A barrier film (16.25 microns) is formed on polypropylene from the above coating solution. The film results in an OTR of 56.3 cc/m$^2$ day @ 1 atm, 23° C., 0% RH, and a permeability of 0.9 cc mm/m$^2$ day atm @ 23° C., 0% RH, which results in a reduction in permeability of 104.9×. The butyl/filler ratio equals 4.00:1

E. 9.0% Solids in Water: 75% butyl latex, 25% MICROLITE® filler

Part A: In a 4 oz glass jar, 11.0 g of Lord® BL-100 Butyl Latex (61.6% butyl latex solution, Lord Corporation) is measured. This latex is stirred slowly with a stir bar on a stir plate. In a 30 mL beaker, 0.1 g BYK®-306 wetting agent (BYK Chemie), 1.5 g of 1N NH$_4$OH and 32.4 g distilled water are mixed into solution, and the solution in the 30 mL beaker is slowly added into the butyl latex solution while stirring slowly.

Part B: In a 50 mL beaker, 24.1 g distilled water and 0.9 g 1N NH$_4$OH are mixed. In a separate 100 mL beaker 30 g of MICROLITE® 963++ filler (7.5% solution, W. R. Grace) is measured, and the solution from the 50 mL beaker is added into the MICROLITE® filler while stirring with a stir bar on a stir plate.

Slowly Part B is added into Part A with medium stirring on the stir plate, avoiding high shear stirring.

A barrier film (12.0 microns) is formed on polypropylene from the above coating solution. The film results in an OTR of 37.5 cc/m$^2$ day @ 1 atm, 23° C., 0% RH, and a permeability of 0.47 cc mm/m$^2$ day atm @ 23° C., 0% RH, which results in a reduction in permeability of 200.9×. The butyl/filler ratio equals 3.00:1

F. 8.0% Solids in Water: 70% butyl latex, 30% MICROLITE® filler

Part A: In a 4 oz glass jar, 9.1 g of Lord® BL-100 Butyl Latex (61.6% butyl latex solution, Lord Corporation) is measured. This latex is stirred slowly with a stir bar on a stir plate. In a 30 mL beaker, 0.1 g BYK®-306 wetting agent (BYK Chemie), 1.3 g of 1N NH$_4$OH and 34.5 g distilled water are mixed into solution, and the solution in the 30 mL beaker is slowly added into the butyl latex solution while stirring slowly.

Part B: In a 50 mL beaker, 22.0 g distilled water and 1.0 g 1N NH$_4$OH are mixed. In a separate 100 mL beaker 32 g of MICROLITE® 963++ filler (7.5% solution, W. R. Grace) is measured, and the solution from the 50 mL beaker is added into the MICROLITE® filler while stirring with a stir bar on a stir plate.

Slowly Part B is added into Part A with medium stirring on the stir plate, avoiding high shear stirring.

A barrier film (15.8 microns) is formed on polypropylene from the above coating solution. The film results in an OTR of 15.7 cc/m$^2$ day @ 1 atm, 23° C., 0% RH, and a permeability of 0.25 cc mm/m$^2$ day atm @ 23° C., 0% RH, which results in a reduction in permeability of 377.6×. The butyl/filler ratio equals 2.34:1.

G. 7.5% Solids in Water: 65% butyl latex, 35% MICROLITE® filler

Part A: In a 4 oz glass jar, 7.9 g of Lord® BL-100 Butyl Latex (61.6% butyl latex solution, Lord Corporation) is measured. This latex is stirred slowly with a stir bar on a stir plate. In a 30 mL beaker, 0.1 g BYK®-306 wetting agent (BYK Chemie), 1.1 g of 1N NH$_4$OH and 35.9 g distilled water are mixed into solution, and the solution in the 30 mL beaker is slowly added into the butyl latex solution while stirring slowly.

Part B: In a 50 mL beaker, 19.0 g distilled water and 1.0 g 1N NH$_4$OH are mixed. In a separate 100 mL beaker 35 g of MICROLITE® 963++ filler (7.5% solution, W. R. Grace) is measured, and the solution from the 50 mL beaker is added into the MICROLITE® filler while stirring with a stir bar on a stir plate.

Slowly Part B is added into Part A with medium stirring on the stir plate, avoiding high shear stirring.

A barrier film (11.6 microns) is formed on polypropylene from the above coating solution. The film results in an OTR of 16.8 cc/m$^2$ day @ 1 atm, 23° C., 0% RH, and a permeability of 0.20 cc mm/m$^2$ day atm @ 23° C., 0% RH, which results in a reduction in permeability of 472.0×. The butyl/filler ratio equals 1.85:1.

H. 6.0% Solids in Water: 60% butyl latex, 40% MICROLITE® filler

Part A: In a 4 oz glass jar, 5.8 g of Lord® BL-100 Butyl Latex (61.6% butyl latex solution, Lord Corporation) is measured. This latex is stirred slowly with a stir bar on a stir plate. In a 30 mL beaker, 0.1 g BYK®-306 wetting agent (BYK Chemie), 0.8 g of 1N NH$_4$OH and 38.3 g distilled water are mixed into solution, and the solution in the 30 mL beaker is slowly added into the butyl latex solution while stirring slowly.

Part B: In a 50 mL beaker, 22.0 g distilled water and 1.0 g 1N NH$_4$OH are mixed. In a separate 100 mL beaker 32 g of MICROLITE® 963++ filler (7.5% solution, W. R. Grace) is measured, and the solution from the 50 mL beaker is added into the MICROLITE® filler while stirring with a stir bar on a stir plate.

Slowly Part B is added into Part A with medium stirring on the stir plate, avoiding high shear stirring.

A barrier film (4.0 microns) is formed on polypropylene from the above coating solution. The film results in an OTR of 21.5 cc/m$^2$ day @ 1 atm, 23° C., 0% RH, and a permeability of 0.081 cc mm/m$^2$ day atm @ 23° C., 0% RH, which results in a reduction in permeability of 1165.4×. The butyl/filler ratio equals 1.49:1.

I. 5.5% Solids in Water: 55% butyl latex, 45% MICROLITE®filler

Part A: In a 4 oz glass jar, 4.9 g of Lord® BL-100 Butyl Latex (61.6% butyl latex solution, Lord Corporation) is measured. This latex is stirred slowly with a stir bar on a stir plate. In a 30 mL beaker, 0.1 g BYK®-306 wetting agent (BYK Chemie), 0.7 g of 1N NH$_4$OH and 39.3 g distilled water are mixed into solution, and the solution in the 30 mL beaker is slowly added into the butyl latex solution while stirring slowly.

Part B: In a 50 mL beaker, 21.0 g distilled water and 1.0 g 1N NH$_4$OH are mixed. In a separate 100 mL beaker 33 g of MICROLITE® 963++ filler (7.5% solution, W. R. Grace) is measured, and the solution from the 50 mL beaker is added into the MICROLITE® filler while stirring with a stir bar on a stir plate.

Slowly Part B is added into Part A with medium stirring on the stir plate, avoiding high shear stirring.

A barrier film (3.6 microns) is formed on polypropylene from the above coating solution. The film results in an OTR of 20.6 cc/m$^2$ day @ 1 atm, 23° C., 0% RH, and a permeability of 0.076 cc mm/m$^2$ day atm @ 23° C., 0% RH, which results in a reduction in permeability of 1241.1×. The butyl/filler ratio equals 1.22:1.

J. 5.0% Solids in Water: 50% butyl latex, 50% MICROLITE® filler

Part A: In a 4 oz glass jar, 4.0 g of Lord® BL-100 Butyl Latex (61.6% butyl latex solution, Lord Corporation) is measured. This latex is stirred slowly with a stir bar on a stir plate. In a 30 mL beaker, 0.1 g BYK®-306 wetting agent (BYK Chemie), 0.6 g of 1N NH$_4$OH and 40.3 g distilled water are mixed into solution, and the solution in the 30 mL beaker is slowly added into the butyl latex solution while stirring slowly.

Part B: In a 50 mL beaker, 20.7 g distilled water and 1.0 g 1N NH$_4$OH are mixed. In a separate 100 mL beaker 33.3 g of MICROLITE® 963++ filler (7.5% solution, W. R. Grace) is measured, and the solution from the 50 mL beaker is added into the MICROLITE® filler while stirring with a stir bar on a stir plate.

Slowly Part B is added into Part A with medium stirring on the stir plate, avoiding high shear stirring.

A barrier film (2.55 microns) is formed on polypropylene from the above coating solution. The film results in an OTR of 17.0 cc/m$^2$ day @ 1 atm, 23° C., 0% RH, and a permeability of 0.041 cc mm/m$^2$ day atm @ 23° C., 0% RH, which results in a reduction in permeability of 2302.4×. The butyl/filler ratio equals 1.00:1.

K. 10.0% Solids in Water: 80% butyl latex, 20% MICROLITE® filler

Part A: In a 4 oz glass jar, 13.0 g of Lord® BL-100 Butyl Latex (61.6% butyl latex solution, Lord Corporation) is measured. This latex is stirred slowly with a stir bar on a stir plate. In a 30 mL beaker, 0.1 g BYK®-306 wetting agent (BYK Chemie), 1.8 g of 1N NH$_4$OH and 30.1 g distilled water are mixed into solution, and the solution in the 30 mL beaker is slowly added into the butyl latex solution while stirring slowly.

Part B: In a 50 mL beaker, 27.5 g distilled water and 0.8 g 1N NH$_4$OH are mixed. In a separate 100 mL beaker 26.7 of MICROLITE® 963++ filler (7.5% solution, W. R. Grace) is measured, and the solution from the 50 ML beaker is added into the MICROLITE® filler while stirring with a stir bar on a stir plate.

Slowly Part B is added into Part A with medium stirring on the stir plate, avoiding high shear stirring.

A barrier film (9.75 microns) is formed on polypropylene from the above coating solution. The film results in an OTR of 53.5 cc/m$^2$ day @ 1 atm, 23° C., 0% RH, and a permeability of 1.0 cc mm/m$^2$ day atm @ 23° C., 0% RH, which results in a reduction in permeability of 94.4×. The butyl/filler ratio equals 4.00:1.

L. 10.0% Solids in Water: 80% butyl latex, 20 % MICROLITE® filler

Part A: In a 4 oz glass jar, 13.0 g of Lord® BL-100 Butyl Latex (61.6% butyl latex solution, Lord Corporation) is measured. This latex is stirred slowly with a stir bar on a stir plate. In a 30 mL beaker, 0.1 g BYK®-306 wetting agent (BYK Chemie), 1.8 g of 1N NH$_4$OH and 30.1 g distilled water are mixed into solution, and the solution in the 30 mL beaker is slowly added into the butyl latex solution while stirring slowly.

Part B: In a 50 mL beaker, 27.5 g distilled water and 0.8 g 1N NH$_4$OH are mixed. In a separate 100 mL beaker 26.7 g of MICROLITE® 963++ filler (7.5% solution, W. R. Grace) is measured, and the solution from the 50 ML beaker is added into the MICROLITE® filler while stirring with a stir bar on a stir plate.

Slowly Part B is added into Part A with medium stirring on the stir plate, avoiding high shear stirring.

A barrier film (10.85 microns) is formed on polypropylene from the above coating solution. The film results in an OTR of 70.3 cc/m$^2$ day @ 1 atm, 23° C., 0% RH, and a permeability of 0.82 cc mm/m$^2$ day atm @ 23° C., 0% RH, which results in a reduction in permeability of 115.1×. The butyl/filler ratio equals 4.00:1.

EXAMPLE 10

Barrier Compositions Varying % Solids with 15% MICROLITE® Filler

A. 20.0% Solids in Water: 85% Polymer Latex butyl latex, 15% MICROLITE® filler

Part A: In a 30 mL beaker, 0.075 g BYK®-023 wetting agent and 8.2 g distilled water are combined. The resulting solution is stirred on a stir plate with a stir bar. In a 4 oz glass jar, 25.5 g of Polymer Latex ELR Butyl Latex (50% butyl latex solution, research sample from Polymer Latex) is measured. The solution in the 30 mL beaker is slowly added into the butyl latex solution while manually stirring and the solution set aside without further stirring.

Part B: In a 30 mL beaker, 10.3 g distilled water and 0.9 g 1N NH$_4$OH are mixed. In a separate 100 mL beaker 30 g of MICROLITE® 963++ filler is measured. The solution from the 30 mL beaker is added into the MICROLITE® filler while stirring with a stir bar on a stir plate.

Stirring of Part A is resumed and Part B is slowly added into Part A with maximum stirring on the stir plate, avoiding high shear stirring.

A barrier film (17.3 microns) on polypropylene from the above coating solution resulted in an OTR of 165 cc/m² day @ 1 atm, 23° C., 0% RH, and a permeability of 3.7 cc mm/m² day atm @ 23° C., 0% RH, which results in a reduction in permeability of 25.4x. Butyl/filler ratio equals 5.67:1.

B. 25.0 % Solids in Water: 85.0% butyl latex, 15.0% MICROLITE® filler

Part A: In a 10 mL beaker, 0.075 g BYK®-023 wetting agent and 1.9 g distilled water are combined. The resulting solution is stirred on a stir plate with a stir bar. In a 4 oz glass jar, 31.9 g of Polymer Latex ELR Butyl Latex (50% butyl latex solution, research sample from Polymer Latex) is measured. The solution in the 10 mL beaker is slowly added into the butyl latex solution while manually stirring and the solution set aside without stirring.

Part B: In a 10 mL beaker, 2.6 g distilled water and 1.1 g 1N NH$_4$OH are mixed. In a separate 100 mL beaker 37.5 g of MICROLITE® 963++ filler is measured. The solution from the 10 mL beaker is added into the MICROLITE® filler while stirring with a stir bar on a stir plate.

Stirring of Part A is resumed and Part B is slowly added into Part A with maximum stirring on the stir plate, avoiding high shear stirring.

A barrier film (20.9 microns) on polypropylene from the above coating solution resulted in an OTR of 125.6 cc/m² day @ 1 atm, 23° C., 0% RH, and a permeability of 3.2 cc mm/m² day atm @ 23° C., 0% RH, which results in a reduction in permeability of 29.5x. Butyl/filler ratio equals 5.67:1.

C. 27.0 % Solids in Water: 85.0 % butyl latex, 15.0% MICROLITE® filler

Part A: In a 4 oz glass jar, 35.0 g of Polymer Latex ELR Butyl Latex and 0.15 g BYK®-023 wetting agent are measured and slowly stirred with a stir bar on a stirplate.

Part B: In a 100 mL beaker 41.2 g of MICROLITE® 963++ filler is measured. Part B is slowly added into Part A with maximum stirring on the stir plate, avoiding high shear stirring.

A barrier film (23.9 microns) on polypropylene from the above coating solution resulted in an OTR of 162.8 cc/m² day @ 1 atm, 23° C., 0% RH, and a permeability of 5.0 cc mm/m² day atm @ 23° C., 0% RH which results in a reduction in permeability of 18.9x. Butyl/filler ratio=5.66:1. 27% is the maximum solids content achieved without removing water from the latex.

EXAMPLE 11

Barrier Coating Using Bromo-Butyl-Latex and Varying % Solids With 20% MICROLITE® Filler A. 15.0 % Solids in Water: 80.0% butyl latex, 20.0% MICROLITE® filler Part A: In a 50 mL beaker, 0.1 g BYK®-306 wetting agent, 3.2 g 1N NH$_4$OH and 18.5 g distilled water are measured and the resulting solution stirred on a stir plate with a stir bar. In a 4 oz glass jar, 23.2 g of Polymer Latex ELR Bromobutyl Latex (51.7% bromo-butyl latex solution, research sample from Polymer Latex) is measured. The solution in the 50 mL beaker is slowly added into the butyl latex solution while manually stirring, and the resulting solution set aside without stirring.

Part B: In a 30 mL beaker, 13.8 g distilled water and 1.2 g 1N NH$_4$OH are mixed. In a separate 100 mL beaker, 40 g of MICROLITE® 963++ filler are measured. The solution from the 30 mL beaker is added into the MICROLITE® filler while stirring with a stir bar on a stir plate.

Stirring of Part A is resumed. Part B is slowly added into Part A with maximum stirring on the stir plate, avoiding high shear stirring.

A barrier film (15.3 microns) on polypropylene from the above coating solution resulted in an OTR of 180.5 cc/m² day @ 1 atm, 23° C., 0% RH, and a permeability of 3.52 cc mm/m² day atm @ 23° C., 0% RH which results in a reduction in permeability of 28.7x. Bromo-butyl/filler ratio= 4.00:1.

B. 18.0 % Solids in Water: 80.0% butyl latex, 20.0% MICROLITE® filler

Part A: In a 50 mL beaker, 0.1 g BYK®-306 wetting agent, 3.9 g 1N NH$_4$OH and 13.1 g distilled water are combined and the resulting solution stirred on a stir plate with a stir bar. In a 4 oz glass jar, 27.9 g of Polymer Latex ELR Bromobutyl Latex is measured; the solution in the 50 mL beaker is slowly added into the butyl latex solution while manually stirring. This solution is set aside without stirring.

Part B: In a 30 mL beaker, 5.6 g distilled water and 1.4 g 1N NH$_4$OH are mixed. In a separate 100 mL beaker 48 g of MICROLITE® 963++ filler are measured. The solution from the 30 mL beaker is added into the MICROLITE® filler while stirring with a stir bar on a stir plate. Stirring of Part A is resumed. Part B is slowly added into Part A with maximum stirring on the stir plate, avoiding high shear stirring.

A barrier film (23.6 microns) on polypropylene from the above coating solution resulted in an OTR of 94.6 cc/m² day @ 1 atm, 23° C., 0% RH, and a permeability of 2.52 cc mm/m² day atm @ 23° C., 0% RH which results in a reduction in permeability of 40.1x. Bromo-butyl/filler ratio= 4.01:1.

C. 20.0 % Solids in Water: 80.0% butyl latex, 20.0% MICROLITE® filler

Part A: In a 30 mL beaker, 0.1 g BYK®-306 wetting agent, 4.3 g 1N NH$_4$OH and 9.7 g distilled water are combined. The resulting solution is stirred on a stir plate with a stir bar. In a 4 oz glass jar, 30.9 g of Polymer Latex ELR Bromobutyl Latex is measured. The solution in the 30 mL beaker is slowly added into the butyl latex solution while manually stirring. This solution is set aside without stirring.

Part B: In a 10 mL beaker, 0.1 g distilled water and 1.6 g 1N NH$_4$OH are mixed. In a separate 100 mL beaker 53.3 g of MICROLITE® 963++ filler is measured. The solution from the 10 mL beaker is added into the MICROLITE® filler while stirring with a stir bar on a stir plate.

Stirring of Part A is resumed. Part B is slowly added into Part A with maximum stirring on the stir plate, avoiding high shear stirring.

A barrier film (19.3 microns) on polypropylene from the above coating solution resulted in an OTR of 104.8 cc/m² day @ 1 atm, 23° C., 0% RH, and a permeability of 2.31 cc mm/m² day atm @ 23° C., 0% RH which results in a reduction in permeability of 43.8x. Bromo-butyl/filler ratio 4.00:1.

D. 22.8 % Solids in Water: 80.0% butyl latex, 20.0% MICROLITE® filler

Part A: In a 10 mL beaker, 0.1 g BYK®-306 wetting agent, 3.0 g 1N NH$_4$OH and 0.0 g distilled water are combined. The resulting solution is stirred on a stir plate with a stir bar. In a 4 oz glass jar, 35.6 g of Polymer Latex ELR Bromobutyl Latex is measured. The solution in the 10 mL beaker is slowly added into the butyl latex solution while manually stirring. This solution is set aside without stirring.

Part B: In a 10 mL beaker, 1.0 g distilled water and 0.0 g 1N NH$_4$OH are mixed. In a separate 100 mL beaker 61.3 g of MICROLITE® 963++ filler is measured. The solution from the 10 mL beaker is added into the MICROLITE® filler while stirring with a stir bar on a stir plate.

Stirring of Part A is resumed. Part B is slowly added into Part A with maximum stirring on the stir plate, avoiding the use of high shear stirring.

A barrier film (18.1 microns) on polypropylene from the above coating solution resulted in an OTR of 153.4 cc/m$^2$ day @ 1 atm, 23° C., 0% RH, and a permeability of 3.4 cc mm/m$^2$ day atm @ 23° C., 0% RH which results in a reduction in permeability of 29.7x. Bromo-butyl/filler ratio= 4.00:1.

EXAMPLE 12
Barrier Coatings Varying % MICROLITE® Filler with 20% Solids Using Bromo-Butyl Latex A. 20.0 % Solids in Water: 85.0% butyl latex, 15.0% MICROLITE® filler Part A: In a 30 mL beaker, 0.1 g BYK®-306 wetting agent, 4.6 g 1N NH$_4$OH and 7.4 g distilled water are combined and the resulting solution stirred on a stir plate with a stir bar. In a 4 oz glass jar, 32.9 g of Polymer Latex ELR Bromobutyl Latex (51.7% bromo-butyl latex solution, research sample from Polymer Latex) is measured. The solution in the 30 mL beaker is slowly added into the butyl latex solution while manually stirring. This solution is set aside without stirring.

Part B: In a 30 mL beaker, 13.8 g distilled water and 1.2 g 1N NH$_4$OH are mixed. In a separate 100 mL beaker 40 g of MICROLITE® 963++ filler is measured. The solution from the 30 mL beaker is added into the MICROLITE® filler while stirring with a stir bar on a stir plate.

Stirring of Part A is resumed. Part B is slowly added into Part A with maximum stirring on the stir plate, avoiding high shear stirring.

A barrier film (19.6 microns) on polypropylene from the above coating solution resulted in an OTR of 172.2 cc/m$^2$ day @ 1 atm, 23° C., 0% RH, and a permeability of 4.25 cc mm/m$^2$ day atm @ 23° C., 0% RH which results in a reduction in permeability of 23.8x. Bromo-butyl/filler ratio= 5.67:1.

B. 20.0 % Solids in Water: 80.0% butyl latex, 20.0% MICROLITE® filler

Part A: In a 30 mL beaker, 0.1 g BYK®-306 wetting agent, 4.3 g 1N NH$_4$OH and 9.7 g distilled water are combined and the resulting solution stirred on a stir plate with a stir bar. In a 4 oz glass jar, 30.9 g of Polymer Latex ELR Bromobutyl Latex is measured. The solution in the 30 mL beaker is slowly added into the butyl latex solution while manually stirring; this solution is set aside without stirring.

Part B: In a 10 mL beaker, 0.1 g distilled water and 1.6 g 1N NH$_4$OH are mixed. In a separate 100 mL beaker 53.3 g of MICROLITE® 963++ filler is measured. The solution from the 10 mL beaker is added into the MICROLITE® filler while stirring with a stir bar on a stir plate.

Stirring of Part A is resumed and Part B is slowly added into Part A with maximum stirring on the stir plate, avoiding high shear stirring.

A barrier film (38.2 microns) on polypropylene from the above coating solution resulted in an OTR of 56.7 cc/m$^2$ day @ 1 atm, 23° C., 0% RH, and a permeability of 2.32 cc mm/m$^2$ day atm @ 23° C., 0% RH which results in a reduction in permeability of 43.6x. Bromo-butyl/filler ratio= 4.00:1.

C. 20.0 % Solids in Water: 75.0% butyl latex, 25.0% MICROLITE® filler

Part A: In a 10 mL beaker, 0.1 g BYK®-306 wetting agent, 3.0 g 1N NH$_4$OH and 0.0 g distilled water are mixed and the resulting solution stirred on a stir plate with a stir bar. In a 4 oz glass jar, 29.0 g of Polymer Latex ELR Bromo-butyl Latex is measured. The solution in the 10 mL beaker is slowly added into the butyl latex solution while manually stirring and this solution set aside without stirring.

Part B: In a 100 mL beaker 66.7 g of MICROLITE® 963++ filler is measured. 1.6 g 1N NH$_4$OH is added to the MICROLITE® filler while stirring with a stir bar on a stir plate.

Stirring of Part A is resumed and Part B is slowly added into Part A with maximum stirring on the stir plate, avoiding high shear stirring.

A barrier film (20.5 microns) on polypropylene from the above coating solution resulted in an OTR of 67.4 cc/m$^2$ day @ 1 atm, 23° C., 0% RH, and a permeability of 1.5 cc mm/m$^2$ day atm @ 23° C., 0% RH which results in a reduction in permeability of 67.4x. Bromo-butyl/filler ratio= 3.00:1.

EXAMPLE 13
Barrier Coating with Butyl Latex Applied to Carcass Rubber Substrate

The elastomeric barrier coating solution described in Example 3 above is applied onto another substrate, an elastomeric substrate referred to as "carcass rubber". Carcass rubber is a mixture of styrene-butadiene rubber, butadiene rubber and natural rubber, and is commonly used in the manufacture of automobile tires.

After the coating solution described in Example 3 is applied to the carcass rubber substrate and allowed to dry, it demonstrates an OTR (measured using a MOCON® OX-TRAN 2/20 module) of 82 cc/m$^2$ day @ 1 atmosphere, 0% RH, 23° C. Permeability of the composition is 1.8 cc mm/m$^2$ day atmosphere @ 0% RH, 23° C. The coating which results from this dried coating mixture provides a reduction in permeability of 52.5 times that of the unfilled polymer.

The coated substrate is then subjected to stress. The coated carcass rubber is flexed about 1100 times at 10% elongation. After flex, the OTR and permeability of the coating is again measured as described above. The OTR of the flexed coated substrate is 173.5 cc/m$^2$ day @ 1 atmosphere, 0% RH, 23° C. Permeability of the coating on the flexed substrate is 4.2 cc mm/m$^2$ day atmosphere @ 0% RH, 23° C. The coating after flex on the substrate provides a reduction in permeability of 22.4 times that of the unfilled polymer.

EXAMPLE 14
Barrier Coating Containing 5% PVOH Terpolymer

Another exemplary barrier coating formulation of the present invention comprises 10% solids in water, 75% by weight butyl latex, 20% by weight MICROLITE® filler, and 5% PVOH terpolymer as a thickener. The coating is prepared as follows:

Part A: In a 4 oz glass jar, 11.47 g of Lord® BL-100 Butyl Latex is measured, and stirred slowly on a stir plate with a stir bar. In a 50 mL beaker, 0.1 g BYK®-306 wetting agent, 1.57 g of 1N NH$_4$OH and 31.84 g distilled water are mixed. The solution in the 50 mL beaker is added into the butyl latex solution while stirring slowly.

Part B: In a 50 mL beaker, 0.5 g of Mowiol® terpolymer of PVB (poly(vinylbutyral))/PVA (poly(vinylacetate))/PVOH (poly(vinylalcohol)) (Hoechst) and 25 g of distilled water are mixed. A stir bar is added to this solution and the solution is heated in a water bath with stirring until dissolved. In a separate 30 mL beaker, 0.8 g of 1N NH$_4$OH and 2.03 g distilled water are mixed. In a separate 100 mL beaker, 26.67 g of MICROLITE® 963++ filler is measured and the solution from the 30 mL beaker is added into the MICROLITE® filler while stirring with a stir bar on a stir plate. To the resulting solution in the 100 mL beaker, the dissolved PVOH solution is added while stirring.

Slowly Part B is added into Part A with medium stirring on the stir plate, avoiding high shear stirring. The resulting formulation had a viscosity of 326 cP (Brookfield DVII+, 60 rpm, 25° C.) which is an increase from a viscosity of 4.5 cP (Brookfield DVII+, 60 rpm, 25° C.) of the formulation without the PVOH terpolymer thickener.

A barrier film (4.9 microns) on polypropylene from the above coating solution resulted in an OTR of 171.1 cc/m$^2$ day @ 1 atm, 23° C., 0% RH, a permeability of 1.05 cc mm/m$^2$ day atm @ 23 C, 0% RH which results in a reduction in permeability of 89.9x. Butyl/filler ratio equals 3.7:1.

EXAMPLE 15
Barrier Coating Containing 5.5% PVOH Terpolymer

Another exemplary barrier coating formulation of the present invention comprises 10% solids in water, 74.5% by weight butyl latex, 20% by weight MICROLITE® filler, and 5.5% PVOH terpolymer as a thickener. The coating is prepared as follows:

Part A: In a 8 oz glass jar, 28.48 g of Lord® BL-100 Butyl Latex is measured. A stir bar is added and the latex stirred slowly on a stir plate. In a 100 mL beaker, 0.25 g BYK® 306 wetting agent, 3.96 g of 1N NH$_4$OH and 79.81 g distilled water are mixed. The solution in the 100 mL beaker is slowly added into the butyl latex solution while stirring slowly.

Part B: In a first 50 mL beaker, 1.375 g of Mowiol® terpolymer of PVB (poly(vinylbutyral))/PVA (poly (vinylacetate))/PVOH (poly(vinylalcohol)) (Hoechst) and 30 g of distilled water are mixed. A stir bar is added to this solution and the solution is heated in a water bath with stirring until dissolved. In a second 50 mL beaker, 2.0 g of 1N NH$_4$OH and 37.46 g distilled water are mixed. In a separate 150 mL beaker, 66.67 g of MICROLITE® 963++ filler is measured. The solution from the second 50 mL beaker is added into the MICROLITE® filler while stirring with a stir bar on a stir plate. To the resulting solution in the 150 mL beaker, the dissolved PVOH solution is added while stirring.

Part B is added into Part A with medium stirring on the stir plate, avoiding high shear stirring. The resulting formulation had a viscosity of 370 cP (Brookfield DVII+, 60 rpm, 25° C.) which is an increase from a viscosity of 4.5 cP (Brookfield DVII+, 60 rpm, 25° C.) of the formulation without the PVOH terpolymer thickener.

A barrier film (4.0 microns) on polypropylene from the above coating solution resulted in an OTR of 130.8 cc/m$^2$ day @ 1 atm, 23° C., 0% RH, a permeability of 0.62 cc mm/m$^2$ day atm @ 23° C., 0% RH which results in a reduction in permeability of 152.2x. Butyl/filler ratio equals 3.7:1.

EXAMPLE 16
Barrier Coating Containing 4.3% Lithium Chloride and Cure Package Another exemplary barrier coating of the present invention contains 11.7% solids in water, 68.4% by weight butyl latex, 17.1% w/w MICROLITE® filler, 4.3% w/w lithium chloride as a thickener and 10.2% w/w of a "cure package" to enhance curing of the coating on a substrate. The barrier coating was prepared as follows:

Part A: In a 8 oz glass jar, 78.2 g of Lord® BL-100 Butyl Latex was measured and a stir bar was added. This solution was stirred slowly on a stir plate. In a 150 mL beaker, 0.3 g BYK® 306 wetting agent, 10.9 g of 1N NH$_4$OH and 118.5 g distilled water are combined. The solution in the 150 mL beaker is slowly added into the butyl latex solution while stirring slowly. The glass jar is placed into a 70° C. water bath with mechanical stirring. Stirring in the 70° C. bath is continued for 15 minutes and then 13.8 g of a cure package Ti-Rite #M1 (containing about 21.4% by weight zinc oxide, about 10–11% by weight sulfur, about 47–48% by weight water, about 2–3% of a dispersing agent, about 14–15% of zinc dibutyldithio-carbamate and about 3–4% zinc 2-mercaptobenzothiazole, Technical Industries, Inc.) is added. The solution is stirred and heated for 2 hours, after which it is removed from the 70° C. water bath to a 250 C water bath with stirring until cooled. 3 g lithium chloride (Fisher Scientific) dissolved in 75 g distilled water is added and the solution stirred for 1 hour. After 1 hour, 0.3 g FOAMASTER VL defoamer (Henkel) is added to the cooled solution, which is stirred for 5 minutes.

Part B: In a 150 mL beaker, 4.8 g of 1N NH$_4$OH and 135.2 g distilled water are mixed. In a separate 250 mL beaker, 160.0 g of MICROLITE® 963++ filler is measured. The solution from the 150 mL beaker is added into the MICROLITE® filler while stirring with a stir bar on a stir plate.

Part B is added slowly into Part A with medium stirring on the stir plate, avoiding high shear stirring. The resulting formulation had a viscosity of 8120 cP (Brookfield DVII+, 0.396 rpm, 25° C.) which is an increase from a viscosity of 4.5 cP (Brookfield DVII+, 60 rpm, 25° C.) of the formulation without the lithium chloride thickener.

A barrier film (13.9 microns) on polypropylene from the above coating solution resulted in an OTR of 59.7 cc/m$^2$ day @ 1 atm, 23 C, 0% RH, and a permeability of 0.89 cc mm/m$^2$ day atm @ 23 C, 0% RH which results in a reduction in permeability of 106.1x. Butyl/filler ratio equals 4.0:1.

A barrier film was coated onto butyl rubber and cured at 170° C. for 20 minutes in an oven. The cured barrier film (13.4 microns) on butyl rubber from the above coating solution resulted in an OTR of 53.7 cc/m$^2$ day @ 1 atm, 23 C, 0% RH, and a permeability of 1.77 cc mm/m$^2$ day atm @ 23° C., 0% RH which results in a reduction in permeability of 53.3x. Butyl/filler ratio equals 4.0:1.

EXAMPLE 17
Elongation or Flex Test

In order to determine the integrity of the coatings after application to a substrate, an elongation or flex test was conducted. Essentially, the coated substrate to be evaluated is attached to one surface of a reinforced elastomeric beam. The beam is bent about its neutral axis in a cyclic fashion so that the coated substrate experiences a repeating sinusoidal tensile strain ranging from 0.1 to 10%. These strains are transferred from the surface of the beam to the substrate, and to the coating.

EXAMPLE 18
Tire with Barrier Coating

The conventional tire manufacture process involves the following steps: Natural and synthetic rubber products are combined with other chemical products, such as curatives, antioxidants, etc. In combination with textile and metallic reinforcing cords, the chemical components are subjected to various semi-finishing processes, such as extrusion and calendering. These semi-finished products are assembled on a tire building drum or drums and the subsequent "green" or uncured tire is vulcanized under pressure and elevated temperature in a curing press. Different versions of this manufacturing process are well known to those of skill in the tire building art.

The barrier coatings of the present invention may be applied onto various tire surfaces during several steps of the tire manufacturing process to accomplish several goals. The following are only examples of some uses of such barrier coatings on tire surfaces and interfaces.

A. Coating on nonbutyl rubber

A thin sheet (0.1–2.0 mm) of inexpensive rubber is fabricated using conventional calendaring, milling or extrusion processing. After the proper geometry is achieved, the sheet is coated on one side with the barrier coating of Example 8. As part of the coating process, the coating is dried (with assistance of forced air, infrared heat, etc.), and then laminated to another rubber sheet, and the laminate is subsequently built into the tire as the innerliner. The dry barrier coating thickness is in the range 1 to 100 microns. The barrier coating is designed to survive up to 100% conformation which occurs during the tire building process.

B. Coating on nonbutyl rubber

A thin sheet (0.1–2.0 mm) of inexpensive rubber is fabricated using conventional calendaring, milling or extrusion processing. After the proper geometry is achieved, the sheet is coated on one or both sides with the barrier coating of Example 8. As part of the coating process, the coating is dried (with assistance of forced air, infrared heat, etc.), and subsequently built into the tire as the innerliner. The dry barrier coating thickness is in the range 1 to 100 microns. The barrier coating is designed to survive up to 100% conformation which occurs during the tire building process.

C. Coating a conventional tire

On a conventional tire line, a thin sheet (0.1–2.5 mm) of inexpensive rubber is placed on the fabrication drum. The barrier coating of Example 8 is coated onto the rotating drum, covering the first applied sheet of rubber. The coating is then dried. The dried barrier coating thickness is in the range 1 to 100 microns. The rest of the tire build continues conventionally. The barrier coating is designed to survive up to 100% conformation which occurs during the tire building process.

D. Coating on an uncured tire

On a conventional tire line, after the uncured tire has been formed, but before spraying mold release on the inside surface of the tire, the barrier coating of Example 8 is coated onto the inside surface of the tire. After spraying, the tire is moved to a drying line, where it is allowed to dry before curing. Dry barrier coating thickness is in the range of 1 to 100 microns. The coating has sufficient toughness to survive local deformations from the curing bladder. In this application, a typical mold release is applied to the inside of the tire after the barrier coating has dried.

E. Coating on a cured tire

On a conventional tire line, after the tire has been cured, preferably while the tire is cooling down between 80° C. and ambient temperature, the barrier coating mixture of Example 8 is coated onto the inside surface of the tire. After coating, the tire is allowed to dry as it follows the normal cooling circuit. The dried barrier coating thickness is in the range of 1 to 100 microns. Before barrier application, the tire is preferably cleaned to remove the mold release.

EXAMPLE 19

Barrier Formulation Applied to Inside of a Cured Tire

A tire is manufactured in such a way that the innerliner, which is normally butyl rubber, is replaced with a nonbutyl rubber, in this case, a natural rubber -SBR-BR-based composition, so that the internal geometry of the finished tire remains unchanged. The inside of the cured tire is first cleaned to remove contamination, such as by release agent residue, etc. by abrasive scrubbing with a strong detergent. The scrubbed tire is then well dried. The aqueous barrier coating of Example 16 is applied to the inside surface of the tire with a Binks type aerated sprayer by rotating the tire relative to the spray gun. The tire and spray gun spray pattern are rotated and translated in such as way that the entire internal surface area is exposed to multiple passes of the barrier mixture. The spraying continues until the appropriate uniform thickness of barrier coating has been achieved. In this case, the wet thickness was about 120 microns. In three tires sprayed with the barrier formulation, the final dry thickness of the barrier formulation was about 12 microns.

The barrier coating is allowed to dry with the assistance of a hot air gun focused on successive spots on the inside surface of the tire such that the surface temperature at any particular spot does not exceed 65° C. The tire is dried in this manner for 45 minutes. The tire is further dried in a forced air convection oven for 30 minutes at 75° C. Finally, the barrier coating is further dried and consolidated by heating the tire in a forced air convection oven for between 8 and 20 minutes at 160° C.

Figure 7:
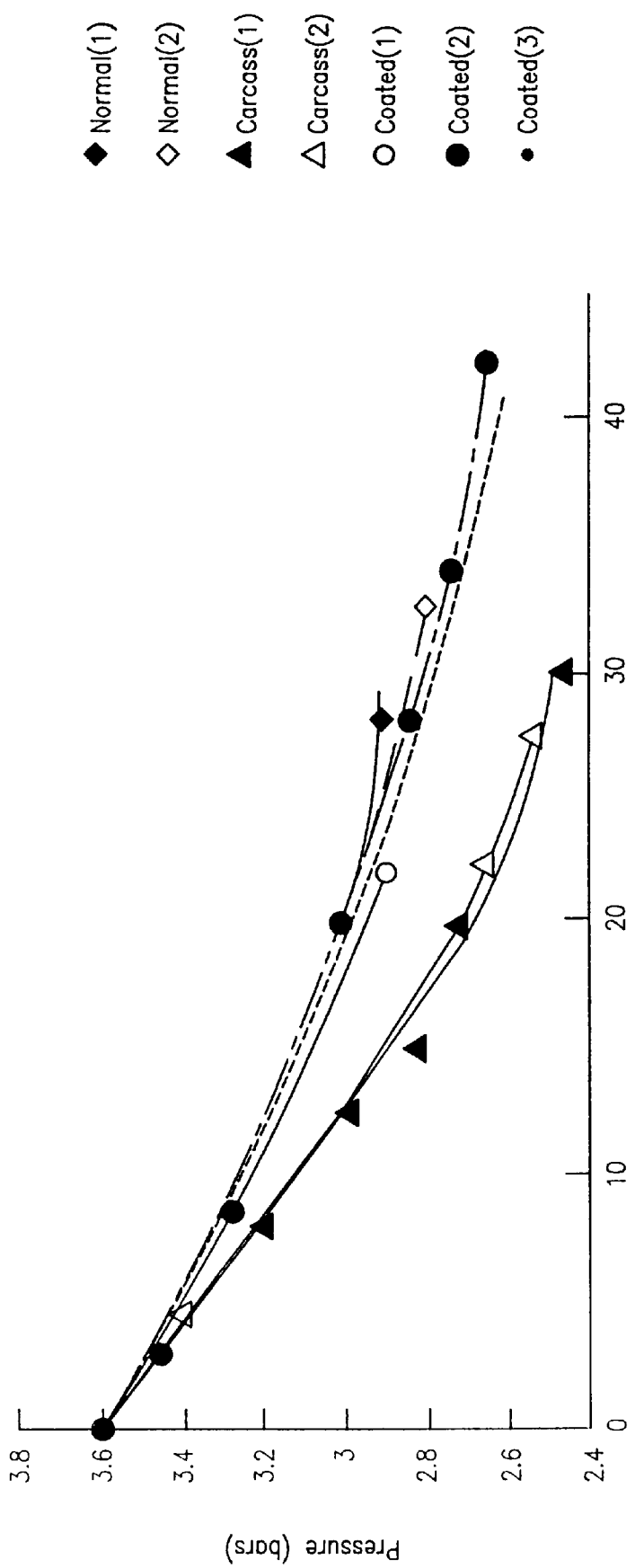
FIG. 7 is a graph of the static air retention at 65° C. in P195/70R14 MX4 tires, which plots pressure in bars vs. time in days for two tires with normal butyl innerliners (◊ and ♦), two tires in which the butyl inner liner was replaced with carcass rubber (Δ and ▲), and three tires having the barrier composition of Example 16 coated onto the carcass rubber innerliner (○, large and small ●).

A. In one experiment, the coated tire is mounted on a rim and inflated for evaluation of air retention under static conditions. Air retention is evaluated by inflating the mounted tire to 3.0 bars of pressure and then inserting the tire into a convection oven held at 65° C. The tire is held statically at this temperature and the internal pressure is measured periodically over a period of around 30 days. Tire air pressure is then plotted against time for each tire. FIG. 7 illustrates the information for 3 tires coated as described above, 2 tires with normal butyl innerliners, and 2 tires prepared with the butyl innerliners replaced by a natural rubber based composition. It can be seen that the coated tires have air pressure retention approximately equivalent to the tires with normal butyl innerliners.

Figure 8:
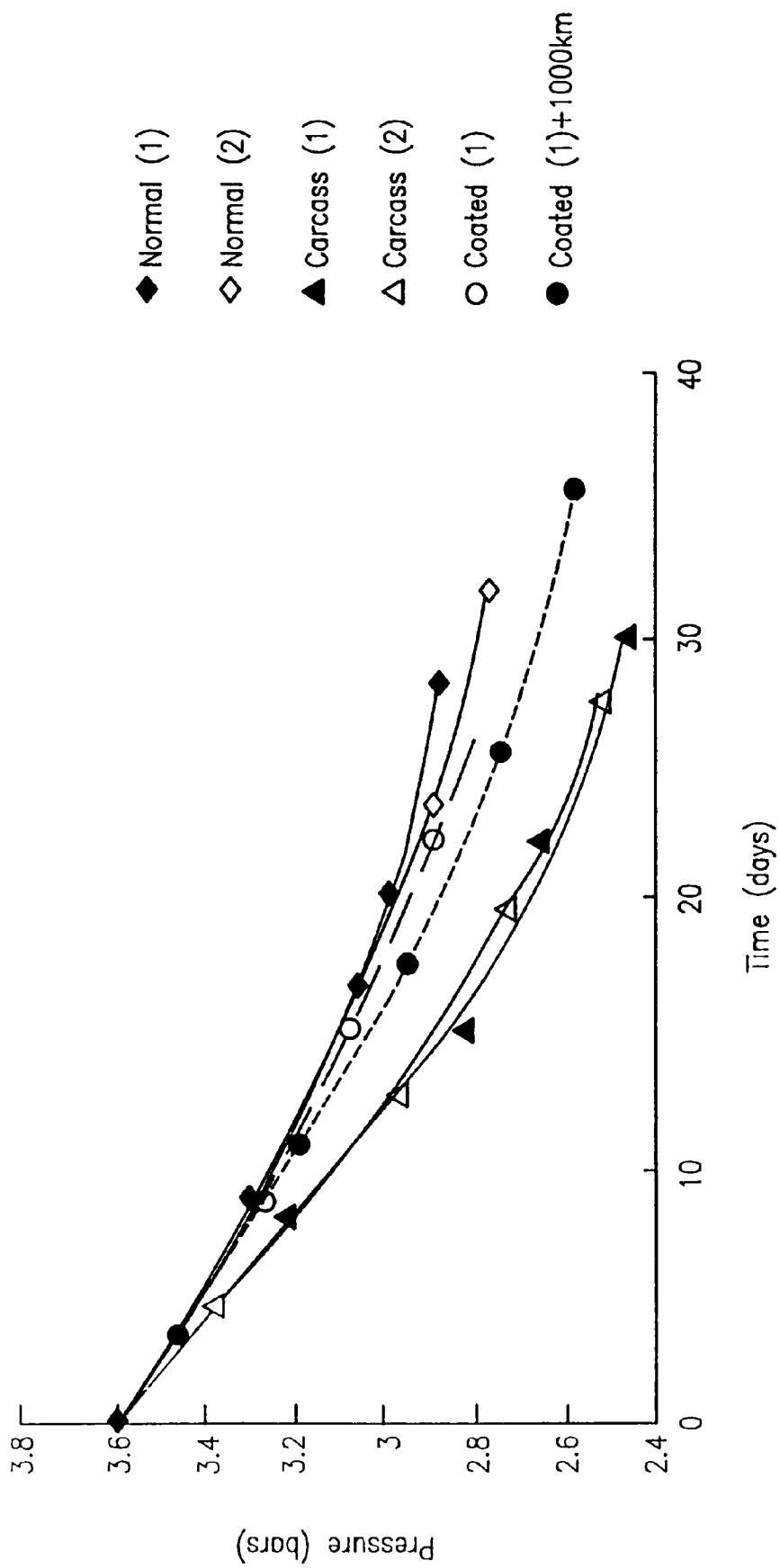
FIG. 8 is a graph of the static air retention at 65° C. for a tire (Michelin Mx4) before and after running 1000 km on a roadwheel, which plots pressure in bars vs. time in days. Two tires have normal butyl innerliners (◊ and ♦), two tires in which the butyl innerliner has been replaced with carcass rubber (Δ and ▲), and two tires in which the carcass rubber innerliner was coated with the barrier coating compositions of Example 16 (○ represents before; ● represents after, 1000 km).

B. In another experiment, the fatigue properties of the barrier coating are evaluated by running a mounted tire for 1000 km at 80 kph under a fixed load and pressure of 2.2 bars. The tire pressure is then adjusted back to 3.0 bars and reevaluated for static air retention at 65° C. Results before and after the roadwheel test are presented in FIG. 8. Equivalent information for 2 coated tires, 2 tires with normal butyl innerliners and 2 tires prepared with the butyl innerliners replaced by a natural rubber based composition are also shown. The coating did experience some degradation of permeability, but generally, the air retention properties before and after 1000 km of roadwheel solicitation were similar, and significantly better than those of the uncoated control tires.

Figure 9:
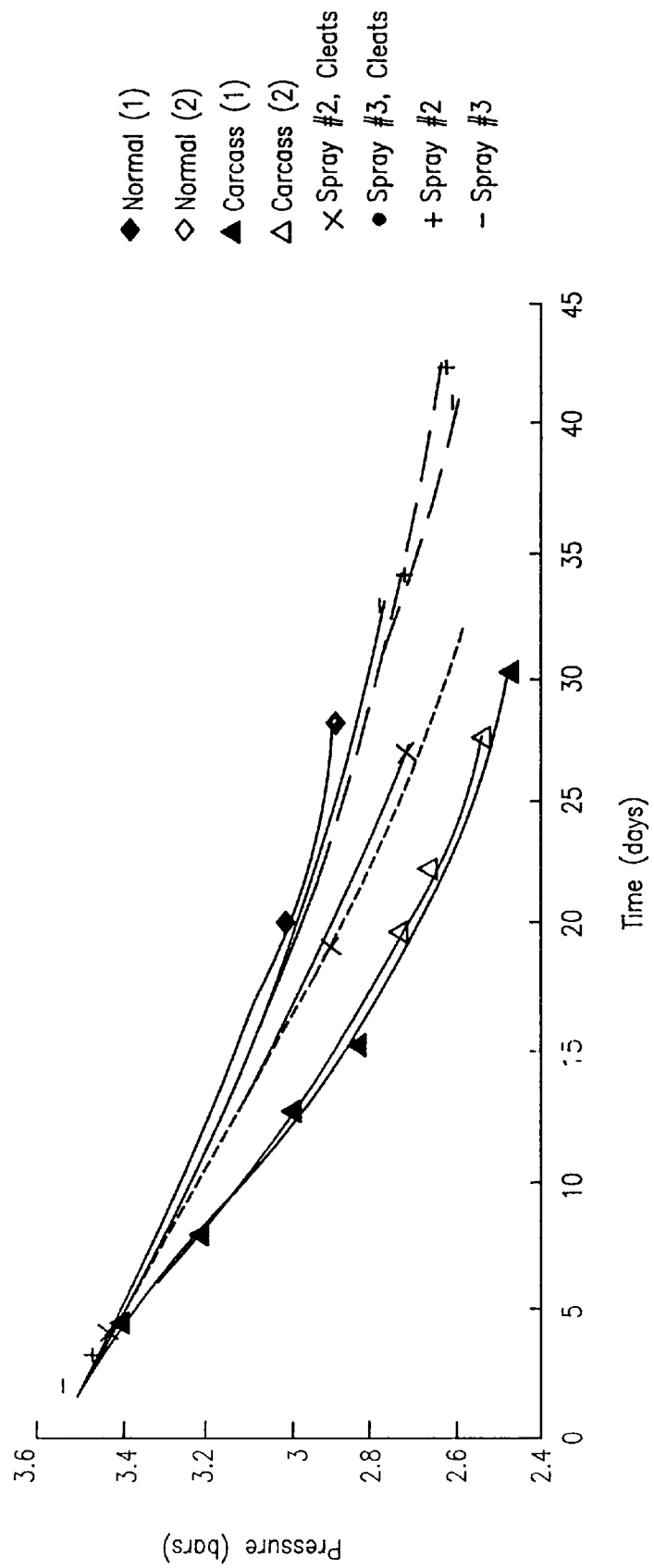
FIG. 9 is a graph of the static air retention at 65° C. for a tire (Michelin MX4) before and after running 8000 km in an endurance test with cleats, which plots pressure in bars vs. time in days. Two tires have normal butyl innerliners (◊ and ♦); two tires have the butyl inner liner replaced with carcass rubber (Δ and ▲); two tires in which the composition of Example 16 was coated over the carcass rubber innerliner and which tires were tested in an endurance test with cleats (* represents before; ● represents after 8000 km); and two tires in which the carcass rubber innerliners were coated with the barrier coating compositions but which were not tested in an endurance test with cleats (+ and −), as described in Example 19.

C. In a further experiment, the fatigue properties of the barrier coating are further evaluated by subjecting 2 coated tires to a severe solicitation test of endurance with cleats for 8000 km at 80 kph under a fixed load and 2.2 bars pressure. After the test, tire pressure is then adjusted to 3.0 bars, and static air retention is measured as described previously. FIG. 9 illustrates tire air pressure plotted against time for 2 tires before and after the fatigue endurance with cleats test for 2 coated tires, 2 tires with normal butyl innerliners and 2 tires prepared with the butyl innerliners replaced by a natural rubber -SBR-BR-based composition. The air retention properties of the tires with barrier coating were around 50% lower than those of the unfatigued tires with barrier coating, but still about 50% better than the tires without the barrier coating, i.e., with NB-SBR-BR-based innerliners.

EXAMPLE 20

Barrier Formulation Applied to Inside Surface of Green Tire

A tire is manufactured in such a way that the inner liner, which is normally butyl rubber, is replaced with a natural rubber formulation so that the internal geometry of the finished tire remains unchanged. Generally, the innerliner can be any type of rubber product, including typical butyl rubber formulations. After the entire uncured tire has been assembled but before mold release is applied to the inside surface of the tire, the barrier coating of Example 16 is applied. The aqueous barrier mixture is applied to the inside surface of the tire with a Binks type aerated sprayer by rotating the tire while the spray gun is held fixed. The tire is rotated and translated in such a way that the entire internal surface area is exposed to multiple passes of the barrier mixture. The spraying continues until the appropriate thickness of barrier coating has been achieved (e.g., up to about 100 microns of wet thickness. After drying, the thickness of the barrier coating is about 10 microns.

The barrier coating is allowed to dry with the assistance of forced hot air focused on successive spots on the inside surface of the tire such that the surface temperature at any particular spot does not exceed 50° C. for longer than 2 minutes. At the same time, the hot air is directed in such a way that all coated surfaces of the tire do achieve a temperature spike of at least 80° C. for around 1–10 seconds. The tire is dried in this manner for 3–30 minutes. An aqueous mold release containing primarily talc, water, and silicone oil is then sprayed on top of the dried coating on the inside surface of the tire. The tire is dried in a conventional manner with forced air at ambient temperatures.

The tire is then subjected to a cure process in a manner well known to those skilled in the art of tire manufacture. During the cure process, the barrier film is further dried, consolidated, and cured along with the rest of the tire. In addition to providing mold release properties, the porous, talc-based mold release provides a path to evacuate water vapor from between the inside of the tire and the curing bladder.

EXAMPLE 21
Butyl Latex with MICROLITE® Filler At Higher % Solids

A barrier coating mixture and dried coating are exemplified here for comparison to the preceding coating mixtures of the invention. This coating mixture contains a high percentage of solids to percent by weight filler in the dried coating, which is outside of the limits taught by FIG. 4 for a butyl latex, vermiculite filler coating mixture. This coating mixture contains 11.5% solids in water, 80% by weight butyl latex, and 20% w/w MICROLITE® filler. The coating mixture was prepared as follows:

Part A: In a 4 oz jar, 14.8 g of Lord® BL-100 butyl latex was measured and stirred slowly with a stir bar on a stir plate. In a 30 mL beaker, 0.5 g BYK 306 wetting agent (BYK Chemie), 3.45 g 1N NH$_4$OH and 26.25 g of distilled water was combined and then mixed into the 4 oz jar.

Part B: In a 100 mL beaker, 30.7 g Microlite 963++ filler (W.R. Grace, 7.5% solution), 22.8 g distilled water and 1.5 g 1N NH$_4$OH were mixed. To this solution, 0.0625 g of a 0.04% solution of Dow Corning 200 Antifoam surfactant (Dow Corning) in 1-methyl-2-pyrrolidinone (Aldrich) was added.

Slowly Part B was added into Part A with medium stirring on the stir plate, avoiding high shear stirring.

A barrier film (20 microns) was formed on polypropylene from the above coating solution. The film resulted in an OTR of 102.6 cc/m$^2$ day @ 1 atm, 23° C., 0% RH, and a permeability of 2.33 cc mm/m$^2$ day atm @ 23° C., 0% RH which results in a reduction in permeability of 40.5×. The butyl/filler ratio equals 4.00.

EXAMPLE 22
Butyl Latex With Aluminum Flake Filler

A barrier coating mixture and dried coating are exemplified here for comparison to the preceding coating mixtures of the invention. This coating mixture contains a filler with a low aspect ratio of 25 or less, in butyl latex coating mixture. This coating mixture contains 17% solids in water: 86% butyl latex, and 14% aluminum filler. The coating mixture was prepared as follows:

Part A: In an 8 oz jar, 50.2 g of Lord® BL-100 butyl latex (62% solids) was mixed with 140 g of distilled water and 10 g of 1N NH$_4$OH. The resulting solution was stirred on a magnetic stir plate with a stir bar. To this, 0.13 g of antifoam A surfactant (Dow Corning) was added while stirring.

Part B: In a 2 oz jar, 5 g of aluminum paste (Reynolds) and 3.7 g of 1,4-butanediol (Aldrich) were combined. In a 30 mL beaker, a solvent solution was prepared containing 1.7 g of n-butanol (Aldrich) and 1 g of 1-methyl-2-pyrrolidinone (Aldrich). The solvent solution in the 30 mL beaker was added to the aluminum paste mixture in the 2 oz jar dropwise while stirring. After addition complete, an additional 1.5 g of n-butanol (Aldrich) was added.

Part B was transferred into an 8 oz jar and part A was added while stirring. To the resulting solution, 0.5 g of Silwet® L-77 surfactant (OSI Specialities, Inc.) was added, with continued stirring.

A barrier film (10.0 microns) on polypropylene from the above coating solution was produced which is characterized by an OTR of 588.0 cc/m$^2$ day @ 1 atm, 23° C., 0% RH, and a permeability of 19.6 cc mm/m$^2$ day atm @23° C., 0% RH which results in a reduction in permeability of 4.5×. The butyl/filler ratio is 6.2.

All references and patents cited above are incorporated herein by reference. Numerous modifications and variations of the present invention are included in the above-identified specification and are expected to be obvious to one of skill in the art. Such modifications and alterations to the compositions and processes of the present invention are believed to be encompassed in the scope of the claims appended hereto.

What is claimed is:

1. A barrier coated article formed by
   (1) applying to a substrate without melt processing an aqueous solution comprising:
      (a) an elastomeric polymer;
      (b) a dispersed exfoliated layered filler having an aspect ratio greater than 25, wherein the ratio of said polymer to said filler ranges from 20:1 to 1:1; and
      (c) at least one surfactant, wherein the solids content of said solution is less than 30%; and
   (2) allowing said solution to dry to a barrier coating having the same polymer to filler as in said solution, wherein said coating provides an at least 10-fold greater reduction in gas, vapor, and chemical permeability than a coating formed of said polymer alone.

2. The article according to claim 1 wherein said solution is in a form selected from the group consisting of a solution, a dispersion, an emulsion, a suspension and a latex.

3. The article according to claim 1 wherein said polymer is a butyl-containing polymer.

4. The article according to claim 3 wherein said butyl-containing polymer is selected from the group consisting of a copolymer of (poly)isobutylene and a second polymer, said copolymer being cured, uncured or partially cured.

5. The article according to claim 3 wherein said butyl-containing polymer is a poly(isobutylene) homopolymer.

6. The article according to claim 4 wherein said copolymer is halogenated.

7. The article according to claim 4, wherein said copolymer is butyl rubber.

8. The article according to claim 6, wherein said copolymer is selected from the group consisting of bromobutyl rubber and chlorobutyl rubber.

9. The article according to claim 4 wherein said butyl-containing copolymer contains more than 50% isobutylene.

10. The article according to claim 1 wherein said polymer is present in said solution at between about 1% to about 30% by weight.

11. The article according to claim 1 wherein said filler is selected from the group consisting of bentonite, vermiculite, montmorillonite, nontronite, beidellite, volkonskoite, hectorite, saponite, laponite, sauconite, magadiite, kenyaite, ledikite and mixtures and solutions of the above silicates.

12. The article according to claim 11 wherein said filler is vermiculite.

13. The article according to claim 1 wherein said dispersed layered filler is present in said solution at between about 1 to about 10% by weight.

14. The article according to claim 1, wherein said solution has a solids content of from about 5% to about 17%.

15. The article according to claim 1 wherein said surfactant is selected from the group consisting of an emulsifier, an anti-foaming agent, a defoaming agent, a dispersing agent, a wetting agent, a leveling agent and a thickener.

16. The article according to claim 15 where said thickener is a polymer containing polyvinyl alcohol.

17. The article according to claim 15 wherein said thickener is lithium chloride.

18. The article according to claim 1 wherein said solution comprises at least two surfactants, which include a wetting agent and an anti-foaming agent.

19. The article according to claim 1 wherein said aqueous solution further comprises a component selected from the group consisting of water, hexane, heptane, toluene, 1-methyl-2-pyrrolidinone, cyclohexanone, ethanol, methanol, other hydrocarbons, and combinations thereof.

20. The article according to claim 1 wherein said solution further comprises curative components which enhance the curing of the barrier coating on a substrate.

21. The article according to claim 1 which has thereon a dried coating comprising about 45% to about 95% by weight of said polymer, between about 5% to about 55% by weight said dispersed layered filler; and between about 1.0% to about 15% by weight said surfactant, said filler in said dried coating or film having an effective aspect ratio greater than 25.

22. The article according to claim 21 wherein said filler is present in said dried coating at greater than about 5% by weight.

23. The article according to claim 21 wherein said filler in said dried coating has an effective aspect ratio greater than 50.

24. The article according to claim 21 wherein said filler in said dried coating has an effective aspect ratio greater than 100.

25. The article according to claim 1 wherein said substrate is flexible or elastomeric and said coating maintains its permeability after repeated mechanical loading and elongation up to about 10% of said substrate.

26. The article according to claim 1 which is a film.

27. The article according to claim 26 which is in the form of a membrane.

28. The article according to claim 26 which is in the form of a glove.

29. The article according to claim 1 comprising a substrate having on its surface a barrier coating comprising about 45% to about 95% by weight of an elastomeric polymer, between about 5% to about 55% by weight of a dispersed exfoliated layered platelet filler having an aspect ratio greater than 25; and between about 1.0% to about 15% by weight of at least one surfactant, said filler in said dried coating or film having an effective aspect ratio greater than 25, wherein said dried coating reduces the gas, vapor or chemical permeability of said article greater than 10-fold the permeability of said substrate coated with said polymer alone.

30. A barer coated article formed by
  (1) applying to a substrate without melt processing an aqueous solution comprising:
    (a) a butyl-containing polymer;
    (b) a dispersed exfoliated layered filler having an aspect ratio about 1000 or greater, wherein the ratio of said polymer to said filler ranges from 20.1 to 1:1; and
    (c) at least one surfactant, herein the solids content of said solution is less than 17%; and
  (2) allowing said solution to dry to a barrier coating having the same polymer to filler as in said solution,
  wherein said coating provides an at least 10-fold greater reduction in gas, vapor, and chemical permeability than a coating formed of said polymer alone.

31. The article according to claim 30 having thereon a died coating that comprises between about 65% to about 90% by weight said butyl-containing polymer, between about 10% to about 35% by weight said vermiculite filler, and between about 1.0% to about 15% by weight said surfactant, said filler in said dried coating or film having an effective aspect ratio of greater than 25.

32. A method of producing a coated article comprising
  (1) applying to a substrate without melt processing an aqueous solution comprising:
    (a) an elastomeric polymer;
    (b) a dispersed exfoliated layered filler having an aspect ratio greater than 25, wherein the ratio of said polymer to said filler ranges from 20:1 to 1:1; and
    (c) at least one surfactant, wherein the solids content of said solution is less than 30%; and
  (2) allowing said solution to dry to a barrier coating having the same polymer to filler as in said solution,
  wherein said coating provides to said substrate an at least 10-fold greater reduction in gas, vapor, and chemical permeability than a coating formed of said polymer alone.

33. The method according to claim 32 wherein said solution is in a form selected from the group consisting of a solution, a dispersion, an emulsion, a suspension and a latex.

34. The method according to claim 32 wherein said polymer is a butyl-containing polymer.

35. The method according to claim 34 wherein said butyl-containing polymer is selected from the group consisting of a copolymer of (poly)isobutylene and a second polymer, said copolymer being cured, uncured or partially cured.

36. The method according to claim 34 wherein said butyl-containing polymer is a poly(isobutylene) homopolymer.

37. The method according to claim 35 wherein said copolymer is halogenated.

38. The method according to claim 35, wherein said copolymer is butyl rubber.

39. The method according to claim 37, wherein said copolymer is selected from the group consisting of bromobutyl rubber and chlorobutyl rubber.

40. The method according to claim 35 wherein said butyl-containing copolymer contains more than 50% isobutylene.

41. The method according to claim 32 wherein said polymer is present in said solution at between about 1% to about 30% by weight.

42. The method according to claim 32 wherein said filler is selected from the group consisting of bentonite, vermiculite, montmorillonite, nontronite, beidellite, volkonskoite, hectorite, saponite, laponite, sauconite, magadiite, kenyaite, ledikite and mixtures and solutions of the above silicates.

43. The method according to claim 32 wherein said filler is vermiculite.

44. The method according to claim 32 wherein said dispersed layered filler is present in said solution at between about 1 to about 10% by weight.

45. The method according to claim 32, wherein said solution has a solids content of from about 5% to about 17%.

46. The method according to claim 32 wherein said Surfactant is selected from the group consisting of an emulsifier, an anti-foaming agent, a defoaming agent, a dispersing agent, a wetting agent, a leveling agent and a thickener.

47. The method according to claim 46 wherein said thickener is a polymer containing polyvinyl alcohol.

48. The method according to claim 46 wherein said thickener is lithium chloride.

49. The method according to claim 46 wherein said solution comprises at least two surfactants, which include a wetting agent and an anti-foaming agent.

50. The method according to claim 32 wherein said aqueous solution further comprises a component selected from the group consisting of water, hexane, heptane, toluene, 1-methyl-2-pyrrolidinone, cyclohexanone, ethanol, methanol, other hydrocarbons, and combinations thereof.

51. The method according to claim 32 wherein said solution further comprises curative components which enhance the curing of the barrier coating on a substrate.

52. The method according to claim 32 wherein said coated article has thereon a dried coating comprising about 45% to about 95% by weight of said polymer, between about 5% to about 55% by weight said dispersed layered filler; and between about 1.0% to about 15% by weight said surfactant, said filler in said dried coating or film having an effective aspect ratio greater than 25.

53. The method according to claim 52 wherein said filler is present in said dried coating or film at greater than about 5% by weight.

54. The method according to claim 52 wherein said filler in said dried coating or film has an effective aspect ratio greater than 50.

55. The method according to claim 52 wherein said filler in said dried coating or film has an effective aspect ratio greater than 100.

56. The method according to claim 32 wherein said coated article is a film.

* * * * *

UNITED STATES PATENT AND TRADEMARK OFFICE
CERTIFICATE OF CORRECTION

PATENT NO. : 6,087,016
DATED : December 21, 2000
INVENTOR(S) : Carrie Feeney

It is certified that error appears in the above-identified patent and that said Letters Patent is hereby corrected as shown below:

Column 10, line 30, replace "MCROLITE" with -- MICROLITE --.

Column 16, line 12, replace "(W=600,000)" with -- (MW=600,000) --.

Column 17, line 32, replace "(DC200)" with -- (DC200®) --.

Column 24, line 49, replace "ratio" with -- ratio= --.

Column 27, line 6, replace "23" with -- 23° --.

Column 28, line 4, replace "250 C" with -- 25°C --.

Column 29, line 63, replace "as" with -- a --.

Column 31, line 6, insert ) after thickness.

Column 32, line 21, replace "4.5X" with -- 4.8X --.

Column 34, line 7 replace "20.1" with -- 20:1 --.

Signed and Sealed this

Fifteenth Day of May, 2001

Attest:

NICHOLAS P. GODICI

*Attesting Officer*    *Acting Director of the United States Patent and Trademark Office*